(12) United States Patent
Liu et al.

(10) Patent No.: US 11,765,670 B2
(45) Date of Patent: Sep. 19, 2023

(54) METHOD AND APPARATUS FOR TRANSMISSION TIMING, BASE STATION, AND COMPUTER READABLE STORAGE MEDIUM

(71) Applicant: ZTE CORPORATION, Guangdong (CN)

(72) Inventors: Wenhao Liu, Guangdong (CN); Feng Bi, Guangdong (CN); Ting Miao, Guangdong (CN); Youxiong Lu, Guangdong (CN); Lin Chen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/280,404

(22) PCT Filed: Nov. 27, 2019

(86) PCT No.: PCT/CN2019/121341
§ 371 (c)(1),
(2) Date: Mar. 26, 2021

(87) PCT Pub. No.: WO2020/064027
PCT Pub. Date: Feb. 4, 2020

(65) Prior Publication Data
US 2022/0039038 A1 Feb. 3, 2022

(30) Foreign Application Priority Data
Sep. 27, 2018 (CN) .......................... 201811131366.7

(51) Int. Cl.
*H04W 56/00* (2009.01)
(52) U.S. Cl.
CPC ... *H04W 56/0005* (2013.01); *H04W 56/0045* (2013.01)

(58) Field of Classification Search
None
See application file for complete search history.

(56) References Cited

U.S. PATENT DOCUMENTS 8,837,373 B2 * 9/2014 Gan ...................... H04B 7/155
370/328
9,049,706 B2 * 6/2015 Zhang ............... H04W 56/0045
(Continued)

FOREIGN PATENT DOCUMENTS

| CN | 102083195 A | 6/2011 |
|---|---|---|
| CN | 102405627 A | 4/2012 |

(Continued)

OTHER PUBLICATIONS

International Search Report for the International Patent Application No. PCT/CN2019/121341, dated Feb. 26, 2020, 2 pages.

(Continued)

*Primary Examiner* — Khaled M Kassim
*Assistant Examiner* — Berhanu D Belete
(74) *Attorney, Agent, or Firm* — KDW Firm PLLC

(57) ABSTRACT

Provided are a transmission timing method and apparatus, a base station, and a computer readable storage medium. In the method, a second node issues timing control information to a first node and/or a third node to control alignment of data transmission received by the second node and sent by the first node and data transmission received by the second node and sent by the third node, or to control alignment of data transmission sent by the second node to the first node and data transmission sent by the second node to the third node.

18 Claims, 12 Drawing Sheets

(56) References Cited

U.S. PATENT DOCUMENTS

| | | | |
|---|---|---|---|
| 2013/0107793 A1* | 5/2013 | Gan | H04W 56/001 |
| | | | 370/315 |
| 2013/0142106 A1* | 6/2013 | Zhang | H04W 56/0045 |
| | | | 370/315 |
| 2016/0338021 A1 | 11/2016 | Chae et al. | |
| 2017/0331577 A1 | 11/2017 | Parkvall et al. | |
| 2018/0092139 A1* | 3/2018 | Novlan | H04W 76/12 |
| 2018/0192412 A1 | 7/2018 | Novlan et al. | |
| 2019/0394084 A1* | 12/2019 | Tsai | H04L 43/16 |
| 2020/0015316 A1* | 1/2020 | Islam | H04W 56/0015 |
| 2020/0022098 A1* | 1/2020 | Takeda | H04L 5/0055 |
| 2020/0045563 A1* | 2/2020 | Luo | H04W 52/42 |
| 2020/0053682 A1* | 2/2020 | Abedini | H04W 56/0025 |
| 2020/0059879 A1* | 2/2020 | Nam | H04W 56/0005 |
| 2021/0168743 A1* | 6/2021 | Sheng | H04L 1/1614 |
| 2021/0195539 A1* | 6/2021 | Sheng | H04W 88/14 |
| 2022/0070809 A1* | 3/2022 | Song | H04W 72/0446 |
| 2022/0104155 A1* | 3/2022 | Dortschy | H04W 56/005 |

FOREIGN PATENT DOCUMENTS

| | | | |
|---|---|---|---|
| CN | 103024796 A | 4/2013 | |
| CN | 106506424 A | 3/2017 | |
| CN | 110113122 A | 8/2019 | |
| JP | S5866573 A | 4/1983 | |
| RU | 2460120 C2 | 9/2007 | |
| WO | 2007042443 A1 | 4/2007 | |
| WO | 2011017846 A1 | 2/2011 | |

OTHER PUBLICATIONS

Huawei et al., "On IAB Node Synchronization and Timing Alignment", 3GPP TSG RAN WG1 Meeting#94, R1-1808087, Aug. 10, 2018.

First Office Action in corresponding RU Appl. No 2021111162, dated Nov. 24, 2021 (10 pages).

ZTE. Discussion on IAB node initial access process. 3GPP TSG RAN WG1 Meeting #93. Busan, Korea, May 21-25, 2018. R1-1806026.

ASUSTeK. Discussion on Timing Alignment for IAB nodes. 3GPP TSG RAN WG1 Meeting #94. Gothenburg, Sweden, Aug. 20-24, 2018. R1-1809250.

First Official Action for Chinese Patent Application No. 201811131366.7, dated Apr. 6, 2022 (14 pages).

First Search Report for Chinese Patent Application No. 201811131366.7, dated Mar. 30, 2022 (five (5) pages).

\* cited by examiner

METHOD AND APPARATUS FOR TRANSMISSION TIMING, BASE STATION, AND COMPUTER READABLE STORAGE MEDIUM

CROSS-REFERENCE TO RELATED APPLICATIONS

This is a National Stage Application, filed under 35 U.S.C. 371, of International Patent Application No. PCT/CN2019/121341, filed on Nov. 27, 2019, which is based on and claims priority to Chinese Patent Application No. 201811131366.7 filed with the CNIPA on Sep. 27, 2018, the disclosures of which are incorporated herein by reference in their entireties.

TECHNICAL FIELD

Embodiments of the present disclosure relate to, but are not limited to, the technical field of new radio (NR) communication of the 5th generation mobile communication technology (5G), and in particular relate to, but are not limited to, a method and device for transmission timing, a base station and a computer-readable storage medium.

BACKGROUND

Compared with Long Term Evolution (LTE), 5G NR technology may use a larger bandwidth, for example, millimeter wave frequency bands, and may apply large-scale antennas and multi-beam systems. Therefore, higher system transmission rates can be provided by the 5G, laying the foundation for developing 5G NR and applying integrated access and backhaul (IAB) base stations. In this way, an opportunity exists in NR networks to deploy IAB in an integrated mode based on access link control and traffic channels to simplify dense network deployment. An IAB base station integrates a radio access link and a radio backhaul link. The access link is a communication link between a user equipment (UE) and the IAB base station, and the radio backhaul link is a communication link between different IAB base stations for data backhaul, so that the IAB base station does not need a wired transmission network for data backhaul. Based on this, it is more convenient to deploy the IAB base station in a dense scenario, so that the burden of deploying a wired transmission network is relieved.

IAB nodes may perform multiplexing of the access link and the backhaul link in time domain, frequency domain or spatial domain. The access link and the backhaul link may be in a same frequency (also called in-band) or be in different frequencies (also called out-band). Effective support on out-band relay is very important for some NR deployment scenarios, and it should be understood that half-duplex interference coordination in in-band is very important. In the situation of half-duplex transmission, it is not assumed in the IAB network that the IAB node can perform transmission operation and reception operation simultaneously, for example, the IAB node cannot perform transmission operation and reception operation simultaneously in a time division duplexing (TDD) mode, but an access operation is not excluded. Due to the limitation of the half duplex of the IAB node, the IAB node cannot send downlink data when receiving data sent by a father node, and similarly, cannot send data to the father node when receiving data from a child node. That is, two transmission operations shown in FIG. 1 cannot be performed. Therefore, the timing transmission control mode for the IAB network supporting a multi-hop link has a low efficiency. Sending data and receiving data cannot be simultaneously achieved in a same time period and need to be staggered through slots or other modes, so that the delay of transmission time is greatly increased, resources to be allocated is wasted, and thus the resource utilization rate is not high.

SUMMARY

Embodiments of the present disclosure provide a method and device for transmission timing, a base station and a computer-readable storage medium, which aims to solve the an excessive low transmission efficiency problem that is caused by the fact that uplink reception and downlink reception or uplink transmission and downlink transmission may not be simultaneously achieved during data transmission control of nodes.

An embodiment of the present disclosure provides a method for transmission timing. The method includes steps described below.

A second node sends timing control information for controlling data transmission to a third node of the second node and/or a first node of the second node.

The timing control information is used to control timing alignment of reception timing of uplink data received by the second node transmitted from the third node and reception timing of downlink data received by the second node transmitted from the first node, or to control timing alignment of transmission timing of downlink data of the second node and transmission timing of uplink data of the second node.

An embodiment of the present disclosure further provides a method for transmission timing. The method includes steps described below.

A third node receives timing control information sent by a second node and downlink transmission timing of each node.

Timing of uplink data sent by the third node to the second node is aligned with timing of downlink data received by the second node from a first node according to the timing control information.

An embodiment of the present disclosure further provides a device for transmission timing. The device for transmission timing includes a first timing control module.

The first timing control module is configured to send timing control information for controlling data transmission to a third node of a second node and/or a first node of the second node.

The timing control information is used to control timing alignment of reception timing of uplink data received by the second node transmitted from the third node and reception timing of downlink data received by the second node transmitted from the first node, or to control timing alignment of transmission timing of downlink data of the second node and transmission timing of uplink data of the second node.

An embodiment of the present disclosure further provides a scheduling device for transmission multiplexing. The device includes a reception module and a second timing adjustment module. The reception module is configured to receive timing control information sent by a second node and downlink transmission timing of each node.

The second timing adjustment module is configured to align timing of uplink data sent by a third node to the second node with timing of downlink data received by the second node from a first node according to the timing control information.

An embodiment of the present disclosure further provides a base station. The base station includes a processor, a memory, a communication unit and a communication bus.

The communication bus is configured to implement radio communication connection between the processor, the communication unit and the memory.

The processor is configured to execute one or more first programs stored in the memory to implement the steps of the method for transmission timing described above.

The processor is configured to execute one or more second programs stored in the memory to implement the steps of the method for transmission timing described above.

An embodiment of the present disclosure further provides a computer-readable storage medium. The computer-readable storage medium stores one or more first computer programs and one or more second computer programs. The one or more first computer programs are executable by one or more processors to implement the steps of the method for transmission timing described above. The one or more second computer programs are executable by the one or more processors to implement the steps of the method for transmission timing described above.

DETAILED DESCRIPTION

Embodiments of the present disclosure are further described below in detail in conjunction with the drawings and specific implementations. The embodiments described herein are merely intended to explain the present disclosure and are not intended to limit the present disclosure.

Embodiment One

Figure 1:
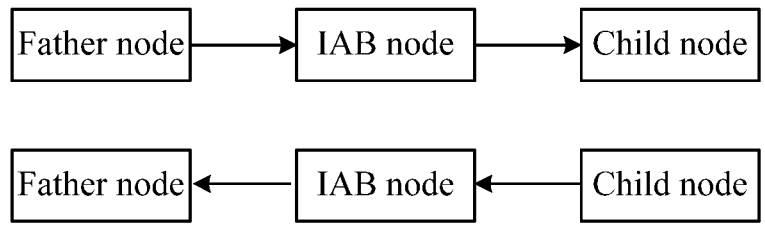
FIG. 1 is a diagram showing data transmission of IAB nodes in the related art.
Figure 2:
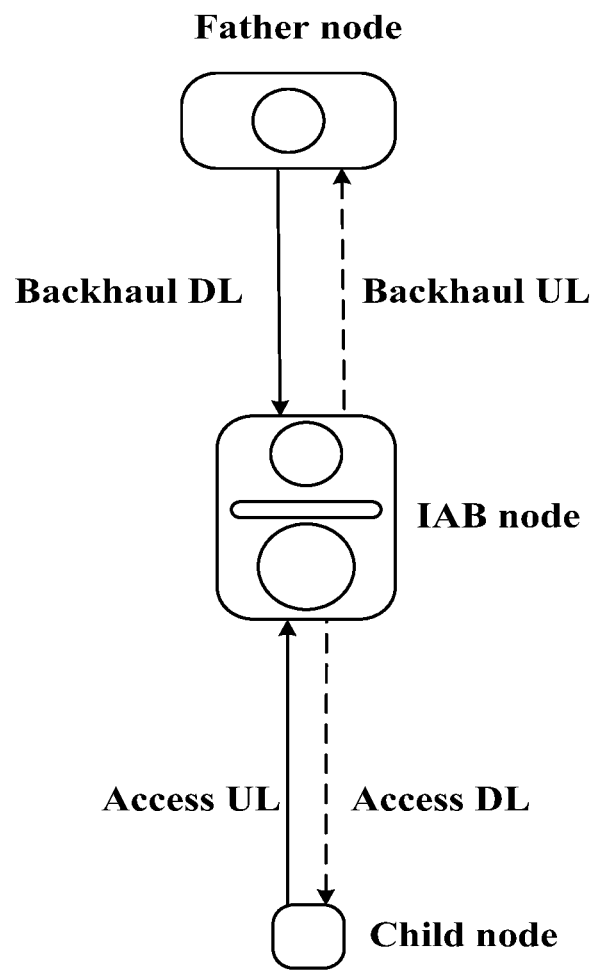
FIG. 2 is a diagram illustrating a relationship of nodes and links in an IAB network according to an embodiment of the present disclosure.

FIG. 2 is a diagram showing a basic structure diagram of an IAB network provided by an embodiment of the present disclosure, and relationships of nodes and links in the integrated access and backhaul (IAB) network are shown in the FIG. 2. As shown in FIG. 2, three nodes from top to bottom are respectively referred to as a father node, an IAB-node and a child node. The IAB-node is a current node which serves as a reference, and a superior node of the IAB-node is referred to as the father node. A link between the current IAB-node and the father node of the current IAB-node is referred to as a backhaul link. The backhaul link is divided into a backhaul downlink (DL) and a backhaul uplink (UL) in terms of a transmission direction. A link between the current IAB-node and the child node of the current IAB-node is referred to as an access link. The access link is divided into an access DL and an access UL in terms of the transmission direction.

The type of a link is determined based on the relative relationship and roles of nodes. For example, if the child node in the figure is a normal terminal, the link is a normal access link for the child node; and if the child node is an IAB node, the link is a backhaul link for the IAB node.

In Rel-14 stage, the backhaul link and access link of a relay node are time-division. A certain node either performs the reception and sending of the access link or the reception and sending of the backhaul link.

In Rel-16 stage, 3rd Generation Partnership Project (3 GPP) meeting discusses efficient multiplexing of the access link and the backhaul link. An IAB network needs to support the characteristics described below.

1) Multi-hop transmission is supported, that is, transmission of more than two hops is supported. In an LTE relay network, only two hops, from a base station to a relay to a UE, is supported, while in an NR IAB network, the next node of an IAB node may also be an IAB node.

2) Half-duplex transmission is supported. In an IAB network, it is not assumed that the IAB node may transmit and receive simultaneously. For example, an IAB node cannot transmit and receive simultaneously in a TDD duplexing mode, but access operation is not excluded.

In an IAB network, maintenance of timing between a gNodeB (gNB) and an IAB node needs to be standardized. A synchronous network is necessary for a TDD system, and for a frequency division duplexing (FDD) system, timing synchronization is also beneficial to performing measurement operation and interference coordination.

Inter-network node synchronization may be achieved through modes of the over-the-air technology (OTA) or the global positioning system (GPS), and network nodes have a unified understanding of absolute time points (within an error range), for example, downlink transmission operation is performed at an absolute time point.

Figure 3:
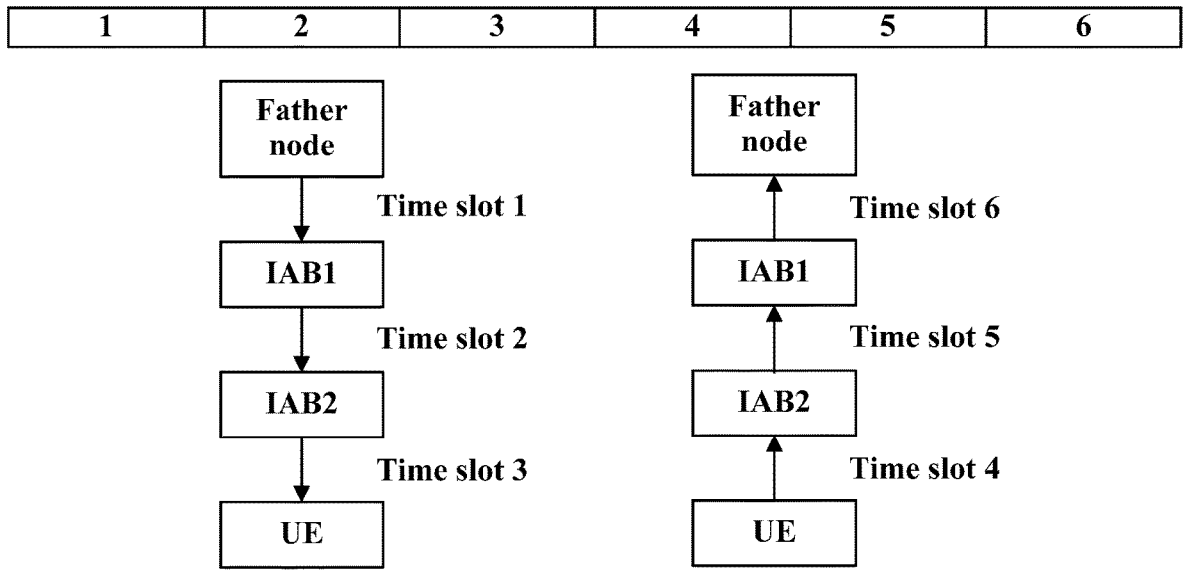
FIG. 3 is a schematic diagram of a UE implementing one time of data transmission and feedback based on the IAB network of FIG. 2.

Due to the limitation of half duplex of the IAB node, the IAB node cannot send downlink data when receiving data sent by a father node, and similarly, cannot send data to the father node when receiving data from a child node. If the scheduling method of half-duplex transmission in the related art is adopted to achieve data transmission, completing one round-trip data transmission may consume relatively more slot resources, as shown in FIG. 3 which takes a three-hop network as an example. As can be seen from FIG. 3, in order to support one time of transmission and feedback of a UE, six pieces of slot resources are consumed. Such transmission efficiency is very low, and allocation and utilization of data resources are not facilitated.

Based on the above situation, the embodiment of the present disclosure provides a method for transmission timing. According to the method, multiplexing of the access link and the backhaul link is considered to be performed through modes of frequency division multiplexing (FDM) or space division multiplexing (SDM) to improve data transmission efficiency in an IAB network. In the embodiment, a second node is an integrated access and backhaul (IAB) node, a first node is a father node of the second node, and a third node is a child node of the second node.

Figure 5:
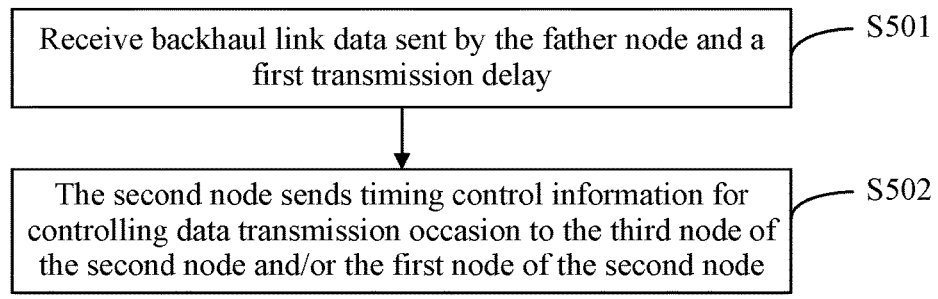
FIG. 5 is a flowchart of a method for transmission timing of IAB nodes according to an embodiment of the present disclosure.

Specifically, as shown in FIG. 5, the method for transmission timing is a method achieved mainly from the perspective of IAB nodes. The method includes the specific steps described below.

In step S501, backhaul link data sent by the father node and a first transmission delay are received. In the step, the backhaul link data includes an absolute timing occasion for downlink data transmission of each node. The absolute timing occasion here is a relative concept, specifically, a timing occasion for controlling downlink data sending of each node.

The step further includes determining the first transmission delay T1 of data transmission from the first node to the second node. The second node determines timing control information for controlling data transmission or reception of the first node or of the third node according to the received first transmission delay. When the timing control information is used for achieving alignment of occasions of sending data, the timing control information sent by the second node to the first node is a request message, and the timing control information sent by the second node to the third node is specific timing adjustment information.

In the embodiment, the absolute timing occasion refers to a common absolute timing occasion maintained by a donor and the IAB node at each level in a mechanism network such as the over-the-air technology (OTA) or GPS network, and the absolute timing time is allowed to have a certain error as long as the error is within an error range. That is, if the nodes send data to a downlink, the data may only be sent at such timing occasion, and each node is considered to send downlink data at the same timing occasion, that is, at the time point of the absolute timing occasion.

In practical application, the timing occasions herein refer to potential downlink transmission occasions. These potential occasions may be frames, the number of orthogonal frequency division multiplexing (OFDM) symbols, or slot boundaries, or time intervals in units of the duration of one or more orthogonal frequency division multiplexing (OFDM) symbols. For the downlink transmission, it is not required that all nodes send at the same time, that is, sending downlink data may only be performed at a potential downlink transmission occasion, including sending downlink control data or downlink traffic data.

In other embodiments, the occasions when the downlink data is sent are taken as reference points for sending, and sending operations or scheduling processes may be performed strictly at this occasion to achieve an offset of several time units by taking these occasions as reference points. An offset unit may be the duration of one or more OFDM symbols.

In step S502, the second node sends timing control information for controlling data transmission occasion to the third node of the second node and/or the first node of the second node.

In the embodiment, after the IAB node receives the backhaul link data sent by the father node, the corresponding timing control information is calculated according to the absolute timing occasion in the backhaul link data, the first transmission delay and the transmission delay between the IAB node and the child node (which is recorded as a second transmission delay). The timing control information is mainly used to control the transmission occasion of the uplink access data of the child node of the IAB node, so that the occasion when the IAB node receives the uplink access data from the child node and the occasion when the IAB node receives the downlink data sent by the father node are aligned with each other, and therefore the multiplexing of simultaneous reception of the uplink access data and the downlink data of the IAB node at the same occasion is achieved.

Further, the uplink sending occasion of the IAB node may be controlled to be aligned with the downlink data sending occasion of the IAB node sending to the child node, so that the multiplexing of simultaneous sending at the same occasion of the IAB node can be achieved, and the efficiency of data transmission and the utilization rate of resources are improved.

In practical application, when an IAB node accesses a child node for communicating with the child node, the child node is not necessarily a node that has established a radio link, but may be a node that is initially accessed, or may be a node that has been accessed multiple times. This step is mainly to reflect the difference between the above two cases, and for the node that has been accessed multiple times, step S502 is performed.

In the embodiment, whether communication access between the second node and the third node is initial access communication or not is detected; for a node that is not initially accessed, the IAB node directly issues the determined timing control information to the child node through a radio link, and the child node adjusts the occasion of sending uplink data of the child node, that is, the occasion of sending uplink access link data, according to the received timing control information. In the embodiment, the timing control information of the child node corresponding to the IAB node may be determined according to the first transmission delay through the modes described below.

The first transmission delay between the first node and the second node and a second transmission delay T2 between the second node and the first node are determined A time offset of timing alignment is calculated according to the first transmission delay and the second transmission delay.

Figure 9:
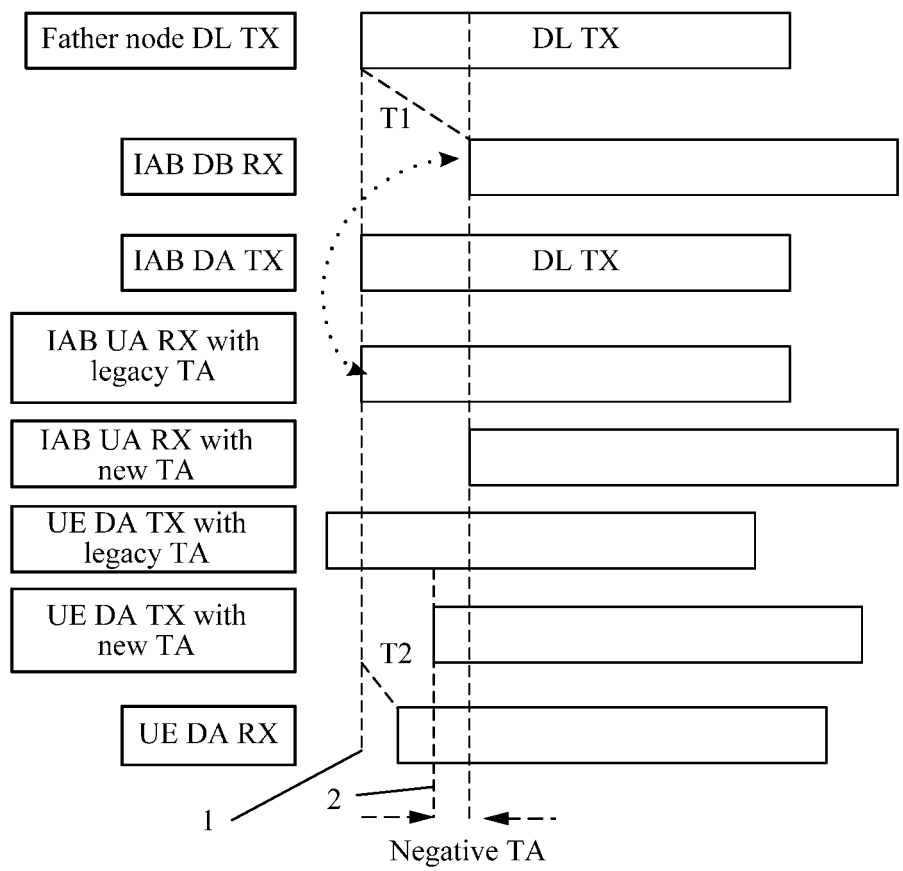
FIG. 9 is a diagram illustrating alignment of slot boundaries of nodes achieving simultaneous reception in an IAB network according to an embodiment of the present disclosure.

That is, the timing control information herein is directed to a certain time unit, the same time unit is obtained through calculation, the child node sends uplink access link data to the IAB node at this time unit, and when the IAB node receives the downlink backhaul link data sent by the father node, the IAB node at the same time receives the uplink access link data sent by the child node. In practical application, when the IAB node receives data from the father node and at the same time receives uplink access link data sent by the child node, the timing relationship of the IAB node depends on a downlink sending occasion and propagation time (PT), and the IAB ensures the timing alignment of the uplink data of the child node and the downlink data of the father node by adjusting the value of timing advance (TA) of the child node. As shown in FIG. 9, the first transmission delay between the father node and the IAB node is T1, and the second transmission delay (transmission on an air interface may also be referred to as a propagation delay) between the IAB node and the child node is T2. The timing of uplink transmission of the child node is modified to be 2*T2−T1, so that the timing alignment of the downlink transmission of the father node and the uplink transmission of the child node can be achieved. In this way, the IAB node can simultaneously receive two paths of data, that is, the time offset is equal to two times the second transmission delay minus the first transmission delay.

Figure 4:
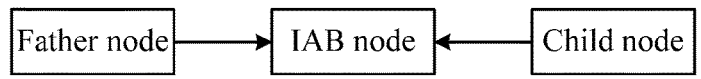
FIG. 4 is a diagram showing data transmission of IAB nodes according to an embodiment of the present disclosure.

In the embodiment, when the timing alignment of the IAB node and the data transmission occasion of the father node and the timing alignment of the IAB node and the data transmission occasion of the child node are achieved through the timing control information, two situations are included. One situation is that simultaneous reception is achieved, that is, data from the father node and uplink access link data sent by the child node of the IAB node are simultaneously received; another situation is that simultaneous sending is achieved, that is, uplink data to the father node and downlink data to the child node of the IAB node are simultaneously sent, as shown in FIG. 4.

In the embodiment, for the situation where data from the father node and uplink access link data sent by the child node are simultaneously received, two alignment modes are included, that is, alignment according to slot boundaries and alignment according to symbols.

If the timing control information is used to control timing alignment of the occasion of uplink data received by the second node from the third node and the occasion of downlink data received by the second node from the first node, that is, if the simultaneous reception of the data from the father node and of the uplink access link data sent by the child node are aligned with each other according to slot boundaries, controlling the timing alignment of the uplink data occasion received by the second node from the third node and the downlink data occasion received by the second node from the first node includes one of the modes described below.

A reception slot of the IAB node receiving access data sent by the child node is timing aligned with a reception slot of the IAB node receiving backhaul link data sent by the father node at a time unit through a mode of a timing adjustment command TA2.

A reception slot of the IAB node receiving access data sent by the child node and a reception slot of the IAB node receiving backhaul link data sent by the father node are configured through a mode of an interface fl-AP between a centralized unit and a distributed unit or a mode of radio resource control (RRC) signaling, and the reception slot of the IAB node receiving the access data sent by the child node is timing aligned with the reception slot of the IAB node receiving the backhaul link data sent by the father node at a time unit.

A reception slot of the IAB node receiving access data sent by the child node is aligned with a reception slot of the IAB node receiving backhaul link data sent by the father node at a time unit through a background configuration mode of operation, administration and maintenance (OAM). These control modes may be achieved in the forms described below.

The father node enables the timing of the uplink access link receive (UA RX) of the IAB node to be aligned with the timing of the downlink backhaul link data receive (DB RX) at a certain time unit through a timing adjustment command TA2.

The father node enables the timing of the UA RX of the IAB node to be aligned with the timing of the DB RX at a certain time unit through a configuration mode such as configuring an fl-AP or RRC signaling.

The timing of the UA RX of the IAB node is aligned with the timing of the DB RX at a certain time unit through the background configuration mode of OAM.

The IAB Node enables the timing of the UA RX of the IAB node to be aligned with the timing of the DB RX at a certain time unit through a timing adjustment command TA2.

The IAB node enables the timing of the UA RX of the child node to be aligned with the timing of the DB RX at a certain time unit through the configuration mode such as configuring an fl-AP or RRC signaling.

The certain time unit described above may be the number of OFDM symbols or slots, or a joint time unit including one or more OFDM symbols or one or more slots.

In the embodiment, alignment may further be achieved in a symbol alignment mode. For the symbol alignment mode, it is determined to perform data transmission at least one OFDM symbol earlier or later, that is, the time offset is the number of orthogonal frequency division multiplexing (OFDM) symbols.

If the timing control information is used to control the timing alignment of the uplink data occasion received by the second node from the third node and the downlink data occasion received by the second node from the first node, after the time offset of the timing alignment is calculated according to the first transmission delay and the second transmission delay, the steps described below are included.

The at least one OFDM symbol before the IAB node in a state of receiving data is read. Calculating the time offset of the timing alignment according to the first transmission delay and the second transmission delay includes the step described below.

The number of OFDM symbols actually needed to be adjusted is determined according to the first transmission delay and/or the second transmission delay and duration of a OFDM symbol.

At this time, controlling the timing alignment of the uplink data occasion received by the second node from the third node and the downlink data occasion received by the second node from the first node may be achieved through one of the modes described below.

The reception timing of the access data sent by the child node by the IAB node is adjusted to be advanced or postponed by the duration of N OFDM symbols than the timing of the father node sending backhaul link data through the mode of a timing adjustment command TA2; and N is greater than or equal to 1.

The reception timing of the access data sent by the child node by the IAB node is configured through the mode of an interface between a centralized unit and a distributed unit or a mode of RRC signaling, and the reception timing of the access data sent by the child node by the IAB node is adjusted to be advanced or postponed by the duration of N OFDM symbols than the timing of the father node sending backhaul link data.

The reception timing of access data sent by the child node by the IAB node is adjusted to be advanced or postponed by the duration of N OFDM symbols than the timing of the father node sending backhaul link data through the background configuration mode of operation, administration and maintenance (OAM).

That is, one OFDM symbol earlier than the sending occasion acquired by the IAB node is still used to receive data, and the IAB node schedules the uplink sending time of the child node to be advanced so that the time when the IAB node receives the child node is advanced for one OFDM symbol compared to the time when the IAB node receives the father node.

The number of symbols actually to be advanced may be determined according to the propagation delay and duration of the OFDM symbol. For example, the propagation time is PT, the duration of the OFDM symbol is time of sustain (TOS), so that the number of advanced OFDM symbols is ceil (PT/TOS), specifically as shown in FIG. 9.

Further, in the embodiment, the received data of the father node is aligned with the received data of the child node according to symbols, but the received data of the child node is advanced for one OFDM symbol than the father node.

Further, if several OFDM symbols at the downlink transmission occasion acquired by the IAB may be used for the uplink reception, the IAB node may further advance the uplink sending time, that is, the solution does not limit the transmission timing of the uplink reception to be only one OFDM symbol advanced.

Similarly, if several OFDM symbols at the next downlink sending occasion acquired by the IAB may be used for the uplink reception, the IAB node may postpone the uplink sending time.

The IAB node informs the next node of postponing the uplink sending time for several occasions, the number of the postponed OFDM symbols is the number of OFDM symbols corresponding to a certain time unit minus the number of OFDM symbols corresponding to the duration to be advanced, and the postponed N OFDM symbols are a fixed time unit minus the number of OFDM symbols to be advanced.

The certain time unit described herein is the number of OFDM symbols or the number of OFDM symbols corresponding to a slot or a short transmission time interval (TTI).

These control modes may be achieved in the forms described below.

The father node enables the timing of the UA RX of the IAB node to be advanced or postponed for the duration of several OFDM symbols relative to the timing of the DB RX through a timing adjustment command TA2.

The father node enables the timing of the UA RX of the IAB node to be advanced or postponed for the duration of several OFDM symbols relative to the timing of the DB RX through the configuration mode such as an fl-AP or RRC signaling.

The timing of the UA RX of the IAB node is to be advanced or postponed for the duration of several OFDM symbols relative to the timing of the DB RX through the background configuration mode of OAM.

The IAB node enables the timing of the UA RX of the IAB node to be advanced or postponed for the duration of several OFDM symbols relative to the timing of the DB RX through a timing adjustment command TA2.

The IAB node enables the timing of the UA RX of the IAB node to be advanced or postponed for the duration of several OFDM symbols relative to the timing of the DB RX through the configuration mode such as an fl-AP or RRC signaling.

The timing of the UA RX of the child node is advanced for the duration of several OFDM symbols relative to the timing of the DB RX through a pre-agreed mode.

The number of the advanced OFDM symbols in the pre-agreed mode is related to the coverage of the network. For example, in transmission-distance environment 1, the duration of N1 OFDM symbols is advanced, in transmission-distance environment 2, the duration of N2 OFDM symbols is advanced, and in transmission-distance environment 3, the duration of N3 OFDM symbols is advanced.

Transmission-distance environments are classified according to transmission distances, and the corresponding order is assumed to be that the distance of the transmission-distance environment 1<the distance of the transmission-distance environment 2<the distance of the transmission-distance environment 3; and the optional value of N1 is 1, the optional value of N2 is 1 and 2, and the optional value of N3 is 2 and 3. It should be noted that the classification mode herein is only to illustrate the selection solution of the pre-agreed value, and the specific number of and the order relationship between these environments are not limited in the embodiment.

In the embodiment, if the communication access between the second node and the third node is initial access communication, the method further includes: the IAB node issues, through a system information broadcasting mode, the timing control information and a signal format for the initial access to the child node.

Further, the timing control information includes a time offset of a fixed value or a data format strategy for adjusting the child node.

Controlling the timing alignment of the uplink data occasion received by the second node from the third node and the downlink data occasion received by the second node from the first node includes: data sent by the child node is adjusted into a reception window where the IAB node receives data from the father node according to the time offset or the strategy.

The data format strategy for adjusting the child node includes the steps described below.

Duration of a cyclic prefix of data of the child node is increased according to the difference between the first transmission delay and the second transmission delay between the IAB node and the child node.

Or, a guard interval is added before a cyclic prefix of data of the child node according to the difference between the first transmission delay and the second transmission delay between the IAB node and the child node.

In the embodiment, when the uplink data sending to the father node and the downlink data sending to the child node of the IAB node are simultaneously achieved, due to the existence of the propagation delay, a deviation between the occasion when the IAB node sends the uplink data to the father node and the occasion of downlink sending exists. Therefore, in the embodiment of the present disclosure, a request for aligning the timing occasion of the uplink data transmission with the timing occasion of the downlink data transmission is sent through the IAB node to the father node.

A response message fed back by the father node according to the request is received, and the number of OFDM symbols to be advanced of the timing of the uplink data transmission is determined according to the first transmission delay and the absolute timing occasion of the downlink data transmission of the IAB node.

The timing occasion of the uplink data transmission is adjusted according to the number of the OFDM symbols to be advanced.

Figure 12:
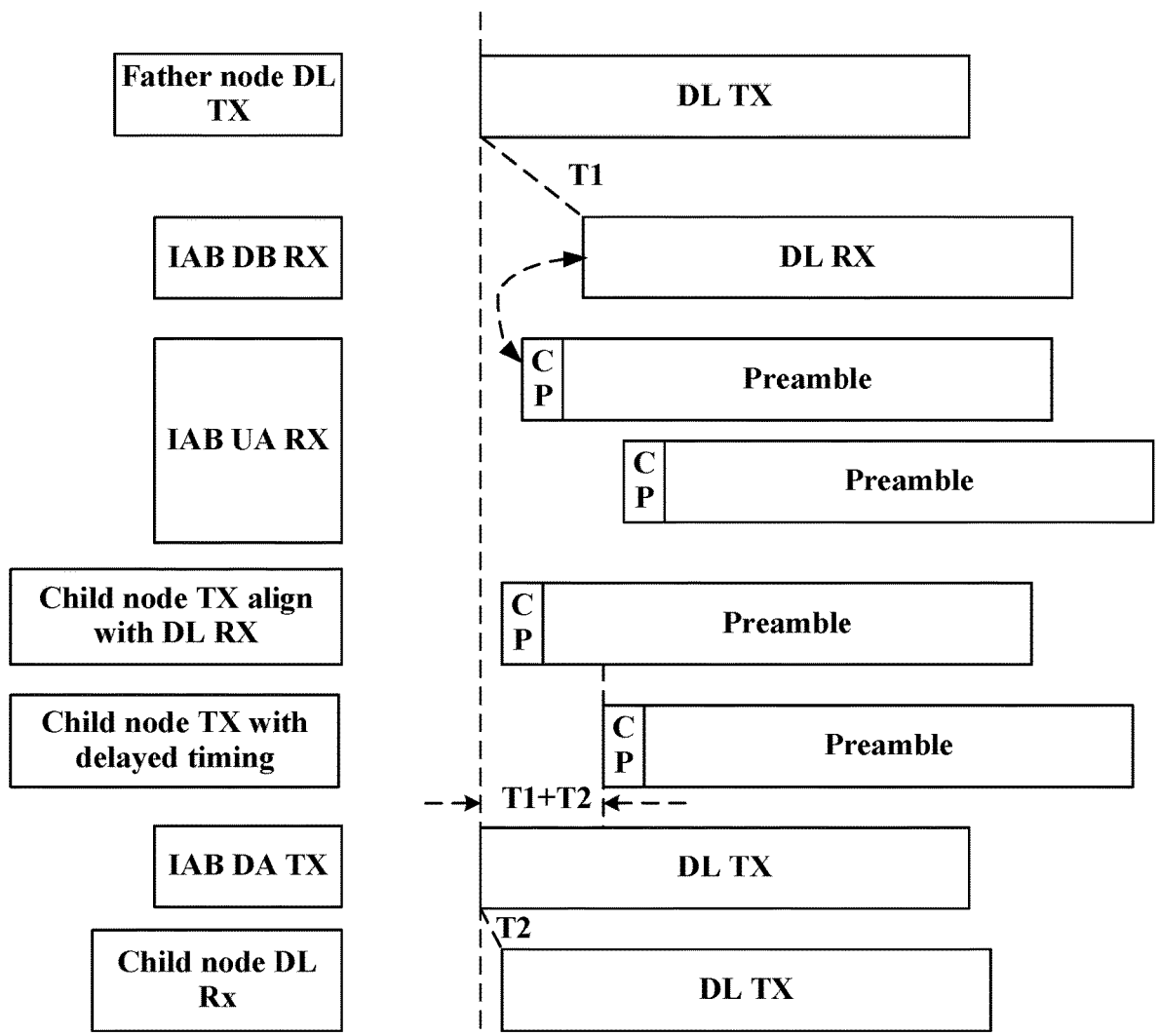
FIG. 12 is a diagram illustrating alignment of slot boundaries of nodes, which are initially accessed, achieving simultaneous reception in an IAB network according to an embodiment of the present disclosure.

In practical application, the adjustment of alignment may be achieved in two modes described below. The two modes are based on changes on data structures, specifically as shown in FIG. 12. In one sending structure, a part of a time unit is sent. For example, one or several OFDM symbols are advanced at the uplink sending occasion of the IAB node scheduled by the father node, and a certain time unit is reserved in order to prevent the collision between the uplink sending to the father node and the uplink reception in time.

In another sending structure, the father node schedules a complete part of a time unit. For example, if the propagation time of the IAB node is very small and one or several OFDM symbols are not advanced when the IAB Node sends data to the father node, the IAB node may send a complete time unit.

The father node postpones a certain number of OFDM symbols on the uplink sending of the IAB node, which corresponds to a third data sending structure.

According to the method for transmission timing provided by the embodiment, the second node sends the timing control information to the first node and/or the third node to control the alignment of the occasion of the second node receiving data sent by the first node and the occasion of the second node receiving data sent by the third node, or control the alignment of the occasion of the second node sending data to the first node and the occasion of the second node sending data to the third node, so that the IAB node can simultaneously receive data from the father node and data from the child node or can simultaneously send data to the father node and send data to the child node. Therefore, the multiplexing of the transmission occasion of nodes is achieved, the data transmission efficiency of the IAB network is improved, the utilization rate of the allocated resources is also improved, the requirements of the UE is better satisfied, and the user experience is improved. The solution is easy to implement and is applicable to various scenarios. The solution will be popularized as a potential 5G standard internationally range and has significant market value.

Embodiment Two

Figure 6:
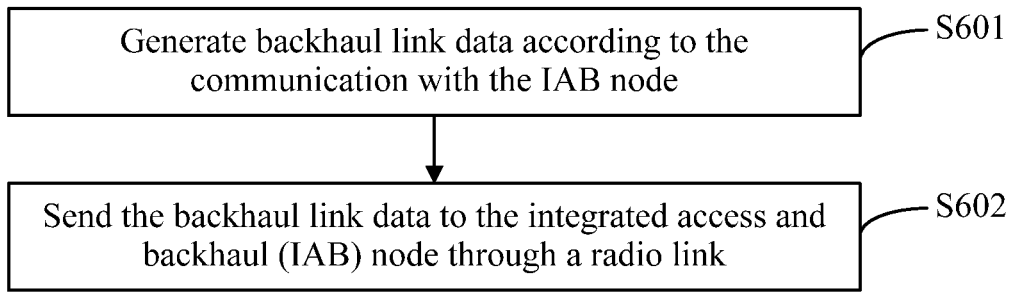
FIG. 6 is a flowchart of a method for transmission timing of a father node according to an embodiment of the present disclosure.

FIG. 6 illustrates a method for transmission timing provided by the embodiment of the present disclosure. The method mainly focuses on the father node of the IAB node, and the method includes the specific processing steps described below.

In step S601, backhaul link data is generated according to the communication with the IAB node.

In step S602, the backhaul link data is sent to the integrated access and backhaul (IAB) node through a radio link.

In the step, the backhaul link data is used to determine the timing control information of the child node corresponding to the IAB node. The timing control information is used to control timing alignment of the IAB node and the data transmission occasion between the IAB node and the child node, and the backhaul link data includes an absolute timing occasion for downlink data transmission of each node. In this step, the IAB node also needs to determine the first transmission delay of the IAB node receiving the backhaul link data.

In the embodiment, if the IAB node achieves multiplexing of simultaneously receiving data from the father node and uplink access link data sent by the child node of the IAB node, the father node issues timing control information for determining the child node corresponding to the IAB node, and the IAB base station adjusts the occasion of the child node sending the uplink data according to the timing control information.

If sending uplink data to the father node and downlink data to the child node of the IAB node are simultaneously achieved, the father node further needs to receive an alignment request sent by the IAB node. The alignment request is a request for alignment of the timing occasion of the IAB node sending the uplink data transmission and the timing occasion of the downlink data transmission.

An alignment time unit is determined according to the alignment request, and a feedback response message carrying the alignment time unit is sent to the IAB node.

In practical application, the response message of the father node includes the situation of the alignment according to the number of OFDM symbols or slots corresponding to an index, and includes complete alignment or a positive or negative timing adjustment based on the number of OFDM symbols or slot boundaries. The adjustment amount is the duration of the OFDM symbol and may be the duration corresponding to one or more OFDM symbols.

In the embodiment, the father node can also achieves receiving data from the father node and the child node at the same occasion achieved by the IAB node by issuing the above data, so that the multiplexing of the transmission occasion of the nodes is achieved. Therefore, the data transmission efficiency of the IAB network is improved, the utilization rate of allocated resources is also improved, the requirement of the UE is better satisfied, and the user experience is improved. The solution is easy to implement and is applicable to various scenarios. The solution will be popularized as a potential 5G standard internationally and has significant market value.

Embodiment Three

Figure 7:
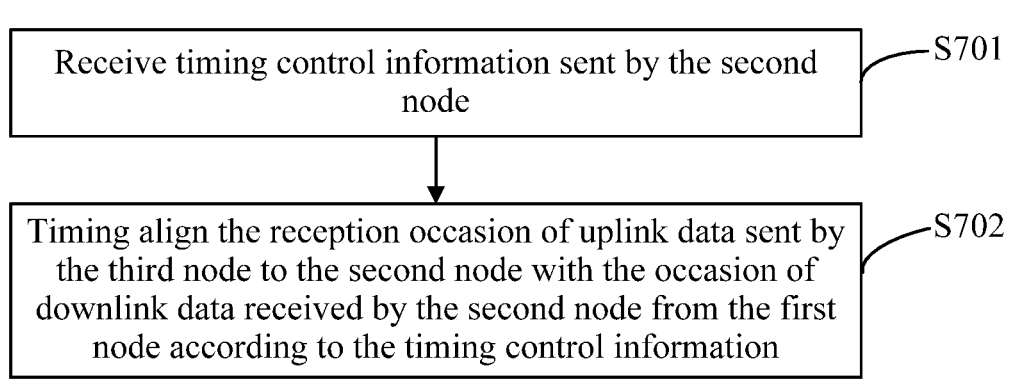
FIG. 7 is a flowchart of a method for transmission timing of a child node according to an embodiment of the present disclosure.

FIG. 7 is a method for transmission timing on the other end provided by the embodiment of the present disclosure. The method is mainly applied to multiplexing and scheduling on a child node of an IAB node. In the embodiment, the second node is an IAB node, the first node is a father node of the second node, and the third node is a child node of the second node.

The method includes the steps described below.

In step S701, timing control information sent by the second node is received.

In the step, the backhaul link data includes the absolute timing occasion for downlink data transmission of each node and the first transmission time delay between the father node and the IAB node. The timing control information is used to control the alignment of the data transmission occasion of the child node corresponding to the IAB node and the data transmission occasion received by the IAB node from the father node.

The backhaul link data in the step is specifically the backhaul link data received by the IAB node from the father node. The IAB node forwards the backhaul link data to the child node together with the timing control information.

In step S702, the reception occasion of uplink data sent by the third node to the second node is timing aligned with the occasion of downlink data received by the second node from the first node according to the timing control information.

In the embodiment, the alignment adjustment of the child node includes two alignment modes, that is, alignment according to slot boundaries and alignment according to symbols.

If the alignment is achieved according to slot boundaries, that is, the timing control information is a time unit, the timing control information controlling the alignment of the data transmission occasion of the child node corresponding to the IAB node and the data transmission occasion received by the IAB node from the father node includes one of the modes described below.

A reception slot of the IAB node receiving access data sent by the child node is timing aligned with a reception slot of the IAB node receiving backhaul link data sent by the father node at a time unit through the mode of a timing adjustment command TA2.

A reception slot of the IAB node receiving access data sent by the child node and a reception slot of the IAB node receiving backhaul link data sent by the father node are configured through the mode of an interface between a centralized unit and a distributed unit or the mode of RRC signaling, and the reception slot of the IAB node receiving the access data sent by the child node is timing aligned with the reception slot of the IAB node receiving the backhaul link data sent by the father node at a time unit.

The time unit described herein is the number of OFDM symbols or the number of OFDM symbols corresponding to a slot or a short TTI.

A reception slot of the IAB node receiving access data sent by the child node is aligned with a reception slot of the IAB node receiving backhaul link data sent by the father node at a time unit through the background configuration mode of operation, administration and maintenance (OAM).

If the alignment is achieved according to symbols, that is, if the timing control information is the number of OFDM symbols, timing aligning the reception occasion of the uplink data sent by the third node to the second node with the occasion of the downlink data received by the second node from the first node according to the timing control information includes one of the modes described below.

Reception timing of the access data sent by the child node by the IAB node is adjusted to be advanced or postponed by duration of N OFDM symbols than the timing of the father node sending backhaul link data through the mode of a timing adjustment command TA2, and N is greater than or equal to 1.

Postponing N OFDM symbols may be that the first N symbols on one time unit don't transmit data, and the subsequent symbols of the corresponding OFDM serial number send data. For example, one time unit has m OFDM symbols, and if it is notified that 3 symbols are postponed for sending, the child node transmits the data according to the format corresponding to the fourth symbol to the m-th symbol.

Further, Postponing N OFDM symbols may be achieved by the number of OFDM symbols corresponding to a certain time unit minus the number of OFDM symbols to be advanced calculated above, and therefore the transmission occasion is postponed. It is assumed that the number of OFDM symbols of one time unit is 14, and the advance N is 1 according to the above calculation, so that the number of OFDM symbols to be postponed is 13. The data sending format after the postponement is transmitted as a complete transmission unit according to a certain time unit. That is, the transmission is performed according to the formats corresponding to the first symbol to the m-th symbols.

Reception timing of the access data sent by the child node by the IAB node is configured through the mode of an interface between a centralized unit and a distributed unit or the mode of RRC signaling, and the reception timing of the access data sent by the child node by the IAB node is adjusted to be advanced or postponed by the duration of N OFDM symbols than the timing of the father node sending backhaul link data.

The reception timing of access data sent by the child node by the IAB node is adjusted to be advanced or postponed by the duration of N OFDM symbols than the timing of the father node sending backhaul link data through the background configuration mode of operation, administration and maintenance (OAM).

In the embodiment, the timing adjustment on the sending occasion of the uplink access link data of the child node is achieved through the above methods, and it is achieved that the IAB node receives data from or sends data to the father node and the child node at the same occasion, so that the multiplexing of the transmission occasion of the nodes is achieved. Therefore, the data transmission efficiency of the IAB network is improved, the utilization rate of allocated resources is also improved, the requirement of the UE is better satisfied, and the user experience is improved. The solution is easy to implement and is applicable to various scenarios. The solution will be popularized as a potential 5G standard internationally and has significant market value.

Embodiment Four

Hereinafter, the method for transmission timing provided by the embodiment of the present disclosure is described in detail in conjunction with specific application scenarios. Specifically, the structure of the IAB network shown in FIG. 2 is taken as an example for description.

In the embodiment, it is achieved that the IAB node simultaneously receives the data from the father node and the uplink access link data sent by the child node of the IAB node, and the alignment is achieved according to slot boundaries.

FIG. 2 includes a father node, an IAB node and a child node. The father node is the father node of the IAB node. The IAB node transmits backhaul link data to the father node through a radio link, the child node is a subordinate link of the IAB node, and the IAB node transmits backhaul data or access link data to the child node through a radio link. Whether the access link or the backhaul link is transmitted depends on the type of the child node. Here, the child node is taken as a common type of a terminal UE for description. It is assumed that the IAB node simultaneously receives the data sent by the father node and the data sent by the child node.

Figure 8A:
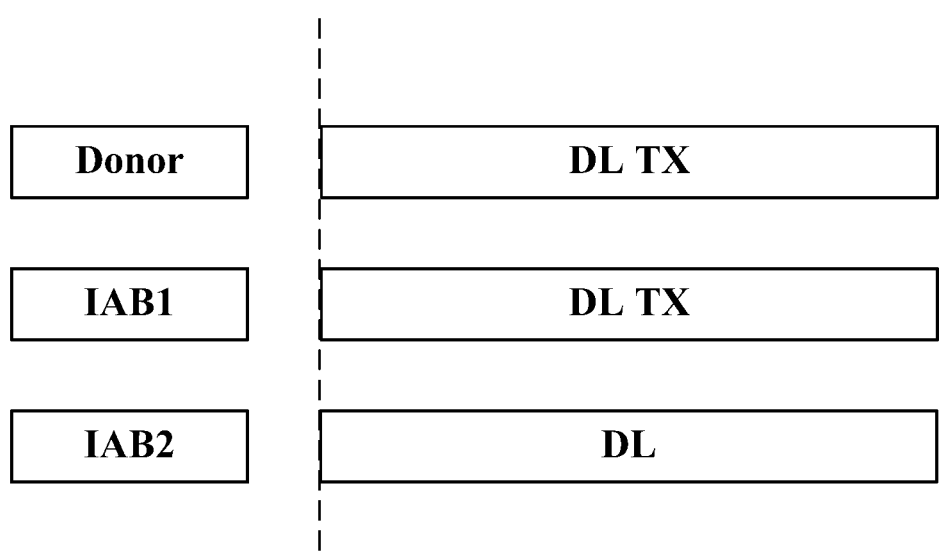
FIG. 8A and FIG. 8B are diagrams illustrating alignment of slots of nodes issuing data according to an embodiment of the present disclosure.

As shown in FIG. 8A, a donor IAB node and the network of the IAB node at each level maintain a common absolute timing occasion (within an error range). This unified timing may be achieved through mechanisms such as OTA or GPS. If these nodes send data to the child node, the data is sent with this timing occasion as a reference point. The reference point is referred to as the downlink sending occasion. In FIG. 8A, DL TX represents downlink transmit.

Figure 8B:
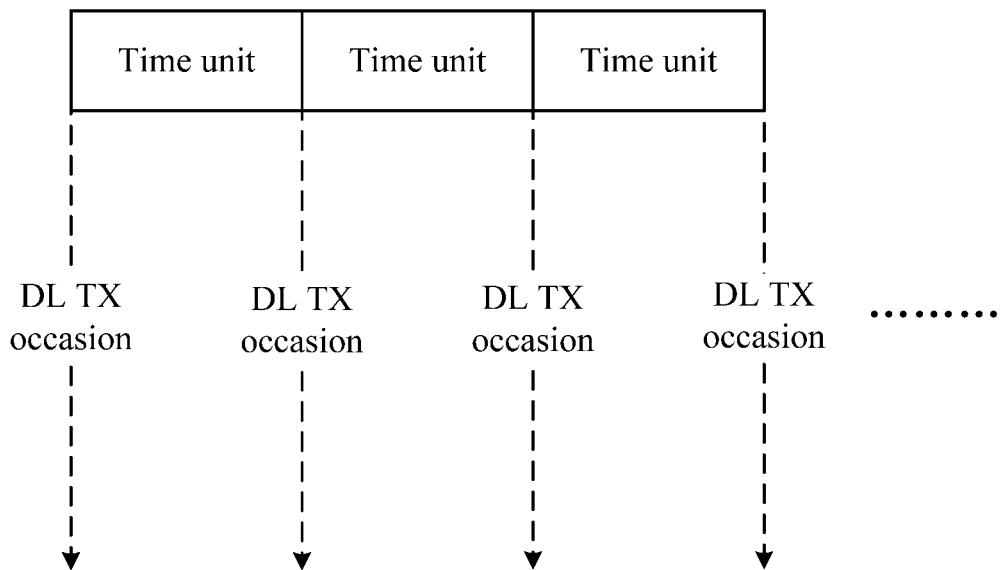

These downlink transmission occasions refer to potential downlink transmission occasions, which may be frames, the number of OFDM symbols, or slot boundaries, or time intervals in units of the duration of several OFDM symbols. For the downlink sending occasion, it is not required that all nodes send at this occasion, but the downlink data may only be sent at a potential downlink transmission occasion. The downlink data includes downlink control data or downlink traffic data. These downlink sending occasions may serve as reference points for downlink sending, and the IAB node or the donor node may strictly perform sending operations or scheduling processes at this occasion to achieve an offset of several amounts of time by taking these occasions as reference points. A unit of the offset of amounts of time may be duration of one or several OFDM symbols. This offset of amounts of time may be embodied in scheduling of adjustment of TA, as shown in FIG. 8B.

When the IAB node receives data from the father node, the timing relationship of the IAB node depends on the downlink sending occasion and the propagation time (PT), and the IAB ensures that uplink data of the child node is timing aligned with downlink data of the father node by adjusting the value of TA of the child node. In the figure, the propagation delay between the father node and the IAB node is T1, the propagation delay between the IAB node and the child node is T2, and the timing alignment of the downlink sending of the father node and the uplink sending of the child node can be achieved as long as the timing of the plink sending of the child node is modified to be 2*T2−T1, so that the IAB node can simultaneously receive two paths of data. FIG. 9 in the embodiment describes a data transmission timing relationship of simultaneously achieving data reception in the IAB network structure shown in FIG. 2. If the father node sends data to the child node, the downlink data is sent with reference to the left dotted line 1, and the downlink transmission of the IAB node in the figure takes a time reference point marked by the dotted line 1 as a potential occasion for downlink data sending. Since the IAB node is limited to half duplex, if the father node transmits downlink data to the IAB node at a downlink sending occasion, the IAB receives the downlink data without performing a data sending operation. In FIG. 9, DL TX represents downlink transmit; DB RX represents downlink link receive; DA TX represents downlink access link transmit; UA RX represents uplink access link receive; DA RX represents downlink access link receive; RX represents receive; TX represents Transmit. Therefore, if the TA adjustment in the related technology is performed, the times when the IAB receives the data of two links are not aligned. As shown in FIG. 9, the timing of two receptions shown by the double arrow is not aligned, and further, the uplink transmission data from the child node of the IAB node may come from multiple nodes, so that it is difficult for the IAB node to simultaneously receive different links.

The timing adjustment is performed in at least one of the modes described below.

The father node enables the timing of the UA RX of the IAB node to be aligned with the timing of the DB RX at a certain time unit through a timing adjustment command TA2.

The father node enables the timing of the UA RX of the IAB node to be aligned with the timing of the DB RX at a certain time unit through the configuration mode such as an f1-AP or RRC signaling.

The timing of the UA RX of the IAB node is aligned with the timing of the DB RX at a certain time unit through the background configuration mode of OAM.

The IAB Node enables the timing of the UA RX of the IAB node to be aligned with the timing of the DB RX at a certain time unit through a timing adjustment command TA2.

The IAB node enables the timing of the UA RX of the child node to be aligned with the timing of the DB RX at a certain time unit through the configuration mode such as an f1-AP or RRC signaling.

The certain time unit described above may be the number of OFDM symbols or slots, or a joint time unit including several OFDM symbols or several slots.

Through the above adjustment, the downlink data is adjusted to the time reference point, marked by the dotted line 2, which is taken as the potential occasion for downlink data sending. After the transmission delay, the timing occasion received at the IAB node is just aligned with the reception occasion of the IAB node receiving the downlink data sent by the father node, so that the IAB node can simultaneously receive the data sent by the father node and the data sent by the child node.

Embodiment Five

In the embodiment, it is achieved that the IAB node simultaneously receives the data from the father node and the uplink access link data sent by the child node of the IAB node, and the alignment is achieved according to symbols.

FIG. 2 includes a father node, an IAB node and a child node. The father node is the father node of the IAB node. The IAB node transmits backhaul link data to the father node through a radio link, the child node is a subordinate link of the IAB node, and the IAB node transmits backhaul data or access link data to the child node through a radio link. Whether the access link or the backhaul link is transmitted depends on the type of the child node. It is assumed that the IAB node simultaneously receives the data sent by the father node and the data sent by the child node. As shown in FIG. 8A, a donor IAB node and the network of the IAB node at each level maintain a common absolute timing occasion (within an error range). This unified timing may be achieved through mechanisms such as OTA or GPS. If these nodes send data to the child node, the data is sent with this timing occasion as a reference point. The reference point is referred to as the downlink sending occasion.

Figure 10:
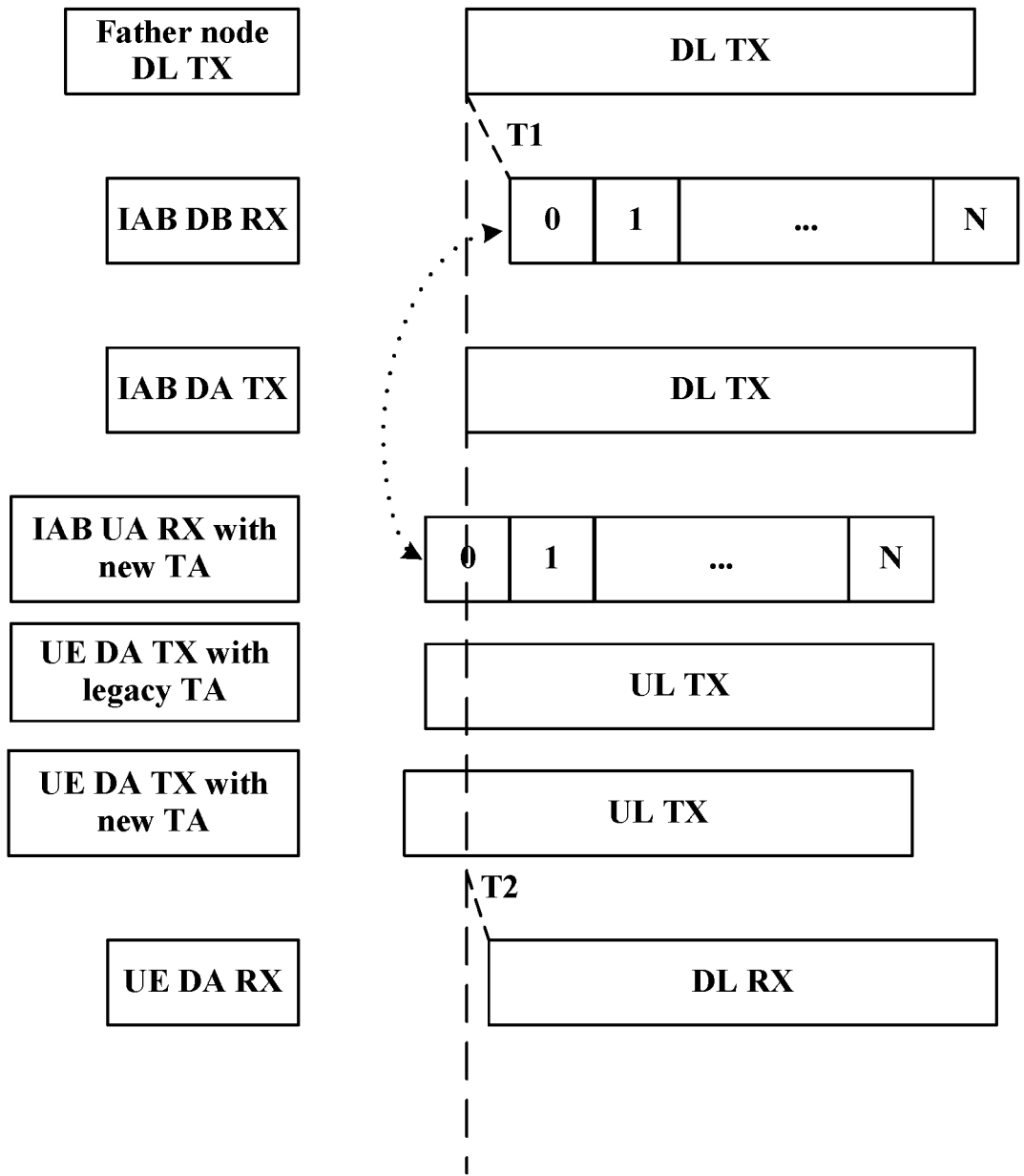
FIG. 10 is a diagram illustrating alignment of OFDM symbols of nodes achieving simultaneous reception in an IAB network according to an embodiment of the present disclosure.

These downlink transmission occasions refer to potential downlink transmission occasions, which may be frames, the number of OFDM symbols, or slot boundaries, or time intervals in units of the duration of several OFDM symbols. For the downlink sending occasion, it is not required that all nodes send at this occasion, but the downlink data may only be sent at a potential downlink transmission occasion. The downlink data includes downlink control data or downlink traffic data. These downlink sending occasions may serve as reference points for downlink sending, and the IAB node or the donor node may strictly perform sending operations or scheduling processes at this occasion to achieve an offset of several amounts of time by taking these occasions as reference points. A unit of the offset of amounts of time may be duration of one or several OFDM symbols. This offset of amounts of time may be embodied in scheduling of adjustment of TA, as shown in FIG. 10.

When the IAB node receives data from the father node, the timing relationship of the IAB node depends on the downlink sending occasion and the propagation time (PT), and the IAB ensures that uplink data of the child node is timing aligned with downlink data of the father node by adjusting the value of TA of the child node. In the figure, the first transmission delay between the father node and the IAB node is T1, the second transmission delay between the IAB node and the child node is T2, and the timing alignment of the downlink sending of the father node and the uplink sending of the child node can be achieved as long as the timing of the uplink sending of the child node is modified to be 2*T2−T1, so that the IAB node can simultaneously receive two paths of data.

In the embodiment, the previous OFDM symbol before the IAB node acquires the sending occasion is still used to receive data, and the IAB node schedules the uplink transmission time of the child node to be advanced so that the time when the IAB node receives the child node is advanced for one OFDM symbol compared to the time when the IAB node receives the father node.

The number of symbols actually to be advanced may be determined according to the propagation delay and duration of the OFDM symbol. For example, the propagation time is PT, the duration of the OFDM symbol is TOS, so that the number of advanced OFDM symbols is ceil (PT/TOS) FIG. 10 in the embodiment describes a data transmission timing relationship of simultaneously achieving data reception in the IAB network structure shown in FIG. 2. If the father node sends data to the child node, the downlink data is sent with reference to the left dotted line, and the downlink transmission of the IAB node in the figure takes a time reference point marked by the dotted line as a potential occasion for downlink data sending. Since the IAB node is limited to half duplex, if the father node transmits downlink data to the IAB node at a downlink sending occasion, the IAB receives the downlink data without performing a data sending operation.

If the TA adjustment in the related technology is performed, the times when the IAB receives the data of two links are not aligned. As shown in FIG. 10, the timing of two receptions shown by the double arrow is not aligned, and further, the uplink transmission data from the child node of the IAB node may come from multiple nodes, so that it is difficult for the IAB node to simultaneously receive different links.

In the embodiment, the IAB node enables the received data of the father node to be aligned with the received data of the child node according to symbols, but the received data of the child node is one OFDM symbol earlier than the father node.

Further, if several OFDM symbols at the downlink transmission occasion acquired by the IAB can be used for the uplink reception, the IAB Node may further advance the uplink sending time, that is, the solution does not limit the transmission timing of the uplink reception to be only one OFDM symbol advanced.

Figure 11:
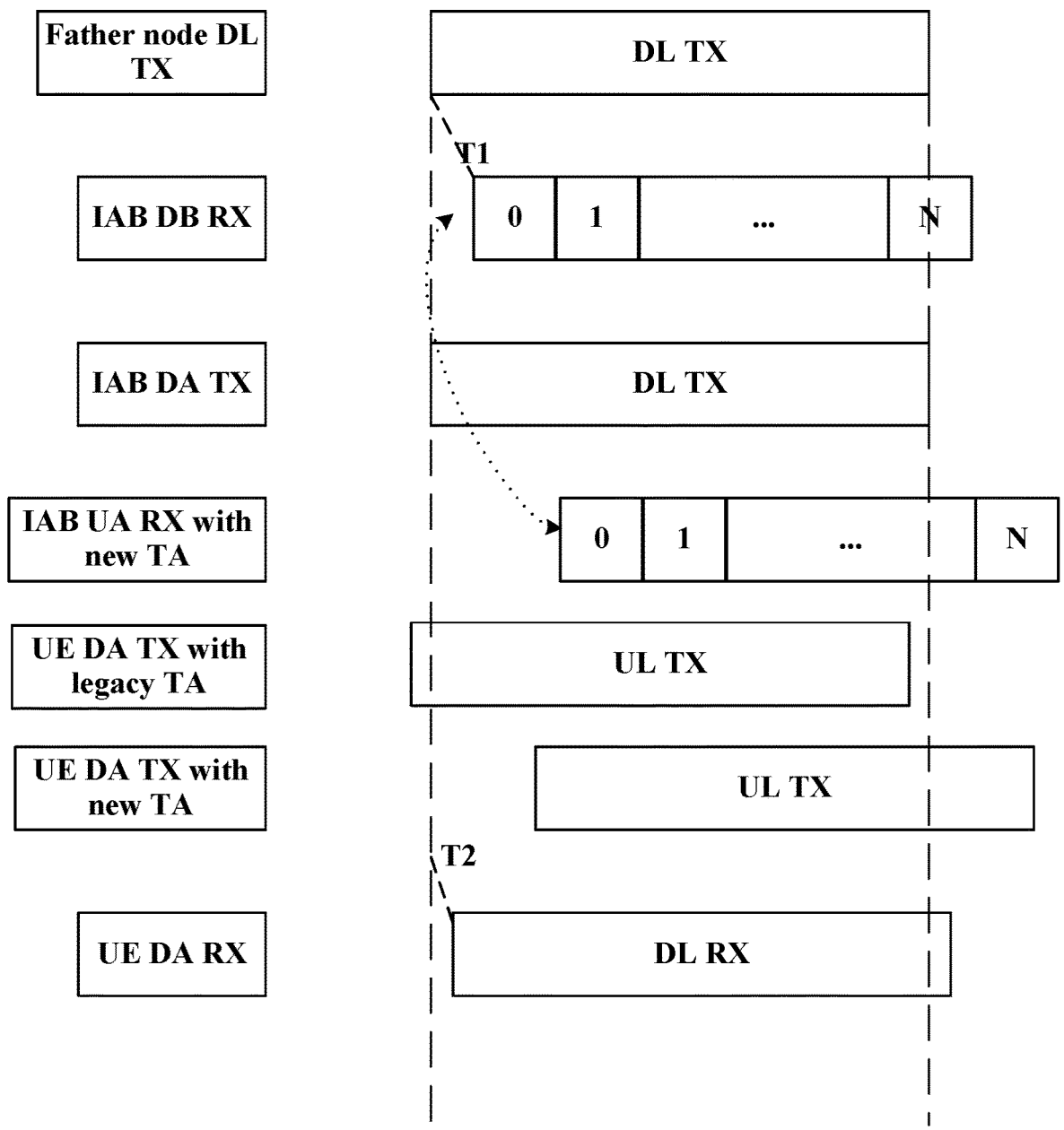
FIG. 11 is another diagram illustrating alignment of OFDM symbols of nodes achieving simultaneous reception in an IAB network according to an embodiment of the present disclosure.

Similarly, if several OFDM symbols at the next downlink sending time acquired by the IAB may be used for the uplink reception, the IAB Node may postpone the uplink sending time, as shown in FIG. 11.

Similarly, the solution does not limit the transmission timing of the uplink reception to be only one OFDM symbol postponed.

The timing adjustment is performed in at least one of the modes described below.

The father node enables the timing of the UA RX of the IAB node to be advanced or postponed for the duration of several OFDM symbols relative to the timing of the DB RX through a timing adjustment command TA2.

The father node enables the timing of the UA RX of the IAB node to be advanced or postponed for the duration of several OFDM symbols relative to the timing of the DB RX through the configuration mode such as configuring an fl-AP or RRC signaling.

The timing of the UA RX of the IAB node is to be advanced or postponed for the duration of several OFDM symbols relative to the timing of the DB RX of the IAB node through the background configuration mode of OAM.

The IAB node enables the timing of the UA RX of the IAB node to be advanced or postponed for the duration of several OFDM symbols relative to the timing of the DB RX through a timing adjustment command TA2.

The IAB node enables the timing of the UA RX of the IAB node to be advanced or postponed for the duration of several OFDM symbols relative to the timing of the DB RX through the configuration mode such as configuring an fl-AP or RRC signaling.

The timing of the UA RX of the child node is advanced for the duration of several OFDM symbols relative to the timing of the DB RX through a pre-agreed mode.

The number of advanced OFDM symbols in the pre-agreed mode is related to the coverage of the network. For example, in transmission-distance environment 1, the duration of N1 OFDM symbols is advanced, in transmission-distance environment 2, the duration of N2 OFDM symbols is advanced, and in transmission-distance environment 3, the duration of N3 OFDM symbols is advanced.

Transmission-distance environments are classified according to transmission distances, and the corresponding order is assumed to be that the distance of the transmission-distance environment 1<the distance of the transmission-distance environment 2<the distance of the transmission-distance environment 3; and the optional value of N1 is 1, the optional value of N2 is 1 and 2, and the optional value of N3 is 2 and 3.

The above classification mode is only to illustrate the selection solution of the pre-agreed value, and the specific number of and the order relationship between these environments are not limited in the embodiment.

Through the above adjustment, the potential occasion for downlink data sending is adjusted. After the transmission delay, the timing occasion received at the IAB node is just aligned with the reception occasion of the IAB node receiving the downlink data sent by the father node, so that the IAB node can simultaneously receive the data sent by the father node and the data sent by the child node.

Embodiment Six

In the embodiment of the present disclosure, when an IAB node accesses the child node of the IAB node for communication, the child node is not necessarily a node that has established a radio link, but may be a node that is initially accessed, or may be a node that has been accessed multiple times. Embodiment four and embodiment five illustrates the node that has been accessed multiple times. For the node that is initially accessed, the first data transmission needs to be performed through a broadcasting mode. The IAB network structure in FIG. 2 is still taken for illustration below.

FIG. 2 includes a father node, an IAB node and a child node. The father node is the father node of the IAB node. The IAB node transmits backhaul link data to the father node through a radio link, the child node is a subordinate link of the IAB node, and the IAB node transmits backhaul data or access link data to the child node through a radio link. Whether the access link or the backhaul link is transmitted depends on the type of the child node. It is assumed that the IAB node simultaneously receives the data sent by the father node and the data sent by the child node. As shown in FIG. 8A, a donor node and the network of the IAB node at each level maintain a common absolute timing occasion (within an error range). This unified timing may be achieved through mechanisms such as OTA or GPS. If these nodes send data to the child node, the data is sent with this timing occasion as a reference point. The reference point is referred to as the downlink sending occasion.

These downlink transmission occasions refer to potential downlink transmission occasions, which may be frames, the number of OFDM symbols, or slot boundaries, or time intervals in units of the duration of several OFDM symbols. For the downlink sending occasion, it is not required that all nodes send at this occasion, but the downlink data may only be sent at a potential downlink transmission occasion. The downlink data includes downlink control data or downlink traffic data. These downlink sending occasions may serve as reference points for downlink sending, and the IAB node or the donor node may strictly perform sending operations or scheduling processes at this occasion to achieve an offset of several amounts of time by taking these occasions as reference points. A unit of the offset of amounts of time may be duration of one or several OFDM symbols.

In the embodiment, the IAB node receives downlink traffic and control sent by the father node and uplink access signals sent by the child node.

FIG. 12 describes a data transmission timing relationship of simultaneously achieving data reception in the network structure shown in FIG. 2. If the father node sends data to the child node, the downlink data is sent with reference to the left dotted line, and the downlink transmission of the IAB node in the figure takes a time reference point marked by the dotted line as a potential occasion for downlink data sending. Since the IAB node is limited to half duplex, if the father node transmits downlink data to the IAB node at a downlink sending occasion, the IAB receives the downlink data without performing a data sending operation. The DL RX in FIG. 12 represents downlink receive.

A relatively large difference may exist between propagation times experienced between nodes. The propagation delay between the father node and the IAB node is large as shown in FIG. 12, but a narrow line-of-sight beam between the father node and the IAB node ensures the quality of the link. However, the propagation delay between the IAB node and the child node of the IAB node may be relatively small, and the propagation delay depends on the distance between the IAB node and the child node. It is assumed that T1>2T2+CP in FIG. 12, so that the complete part of the uplink access signal sent by the child node cannot fall within the reception window of the IAB Node, as shown by the dashed double arrow in FIG. 12.

In the embodiment, since the connection is not established, the initial access point child node accessing the IAB network cannot acquire the timing advance of timing, and then the access node needs to be informed of the propagation delay experienced by the IAB node in a broadcasting mode. The broadcasting mode includes a mode of a system information block (SIB) or a mode of a master information block (MIB).

In another embodiment, a relatively conservative value may further be given through a pre-agreed mode, so that the uplink access signal sent by the child node falls within the reception window of the IAB node. As known from the second set of reception time sequence of the UA RX of the IAB node in FIG. 12, the uplink access signal sent by the child node falls within the reception signal window of the IAB node.

Embodiment Seven

In the embodiment of the present disclosure, for the node that is initially accessed, the timing alignment of the transmission occasion is achieved by the above method, and the timing alignment of the transmission occasion may also be achieved through changing of the data format of the uplink transmission data. Specifically two modes described below may be included.

Duration of a cyclic prefix of data of the child node is increased according to the difference between the first transmission delay and the second transmission delay between the IAB node and the child node.

A guard interval is added before a cyclic prefix of data of the child node according to the difference between the first transmission delay and the second transmission delay between the IAB node and the child node.

The IAB network structure in FIG. 2 is still taken for illustration below.

FIG. 2 includes a father node, an IAB node and a child node. The father node is the father node of the IAB node. The IAB node transmits backhaul link data to the father node through a radio link, the child node is a subordinate link of the IAB node, and the IAB node transmits backhaul data or access link data to the child node through a radio link. Whether the access link or the backhaul link is transmitted depends on the type of the child node. It is assumed that the IAB node simultaneously receives the data sent by the father node and the data sent by the child node. As shown in FIG. 8A, a donor node and the network of the IAB node at each level maintain a common absolute timing occasion (within an error range). This unified timing may be achieved through mechanisms such as OTA or GPS. If these nodes send data to the child node, the data is sent with this timing occasion as a reference point. The reference point is referred to as the downlink sending occasion.

These downlink transmission occasions refer to potential downlink transmission occasions, which may be frames, the number of OFDM symbols, or slot boundaries, or time intervals in units of the duration of several OFDMs. For the downlink sending occasion, it is not required that all nodes send at this occasion, but the downlink data may only be sent at a potential downlink transmission occasion. The downlink data includes downlink control data or downlink traffic data. These downlink sending occasions may serve as reference points for downlink sending, and the IAB node or the donor node may strictly perform sending operations or scheduling processes at this occasion to achieve an offset of several amounts of time by taking these occasions as reference points. A unit of the offset of amounts of time may be duration of one or several OFDM symbols.

In the embodiment, the IAB node receives downlink traffic and control sent by the father node and uplink access signals sent by the child node.

Figure 13:
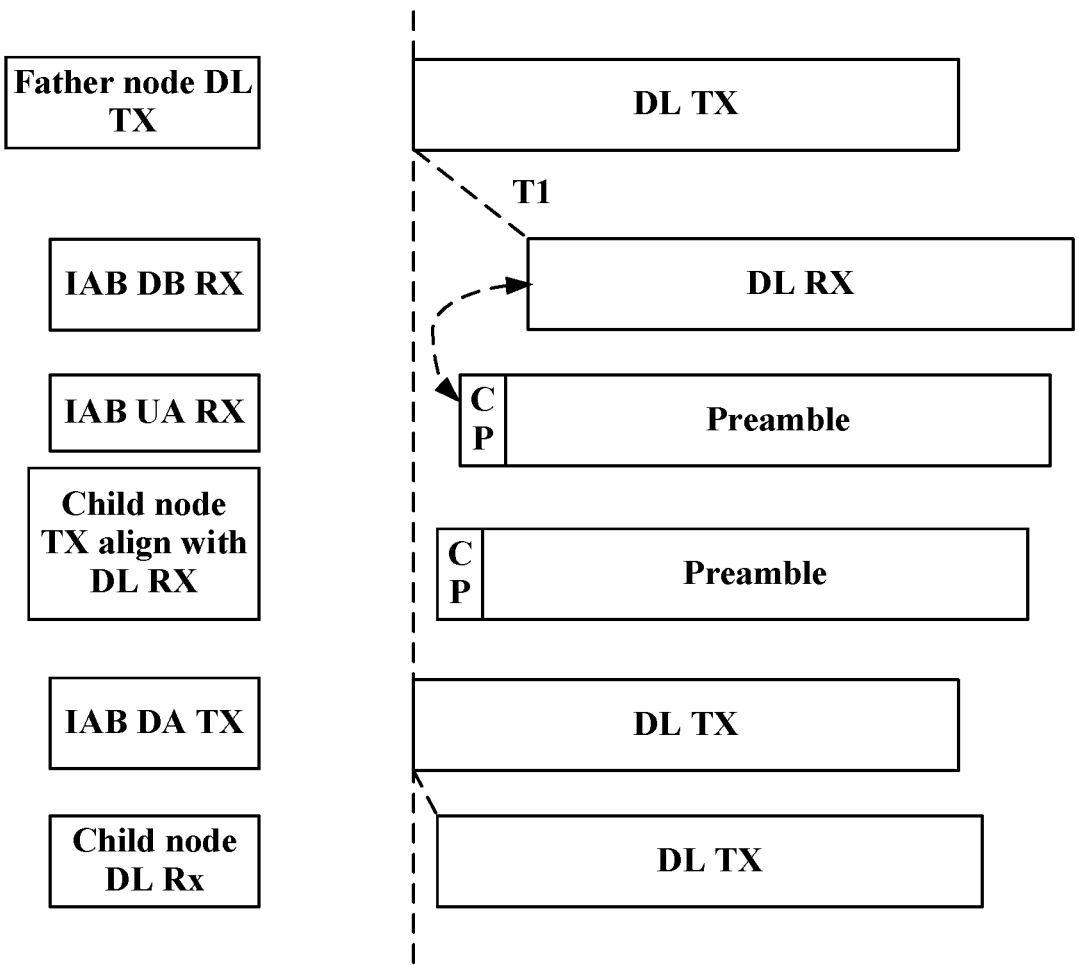
FIG. 13 is another diagram illustrating alignment of slot boundaries of nodes, which are initially accessed, achieving simultaneous reception in an IAB network according to an embodiment of the present disclosure.

FIG. 13 describes a data transmission timing relationship of simultaneously achieving data reception in the network structure shown in FIG. 2. If the father node sends data to the child node, the downlink data is sent with reference to the left dotted line, and the downlink transmission of the IAB node in the figure takes a time reference point marked by the dotted line as a potential occasion for downlink data sending. Since the IAB node is limited to half duplex, if the father node transmits downlink data to the IAB node at a downlink sending occasion, the IAB receives the downlink data without performing a data sending operation.

A relatively large difference may exist between propagation times experienced between nodes. The propagation delay between the father node and the IAB node is large as shown in FIG. 13, but a narrow line-of-sight beam between the father node and the IAB node ensures the quality of the link. However, the propagation time between the IAB node and the child node of the IAB node may be relatively small, and the propagation time depends on the distance between the IAB node and the child node. It is assumed that T1>2T2+ CP in the figure, so that the complete part of the uplink access signal sent by the child node cannot fall within the reception window of the IAB Node, as shown by the dashed double arrow in FIG. 13.

In the embodiment, since the connection is not established, the initial access point child node accessing the IAB network cannot acquire the timing advance of timing. Through the designing of an uplink access signal, that is, a new data format of uplink data, the uplink access signal sent by the child node falls within the reception window of the IAB node. The comparison between the format and the uplink access signal in the related art is shown in FIG. 14.

Figure 14:
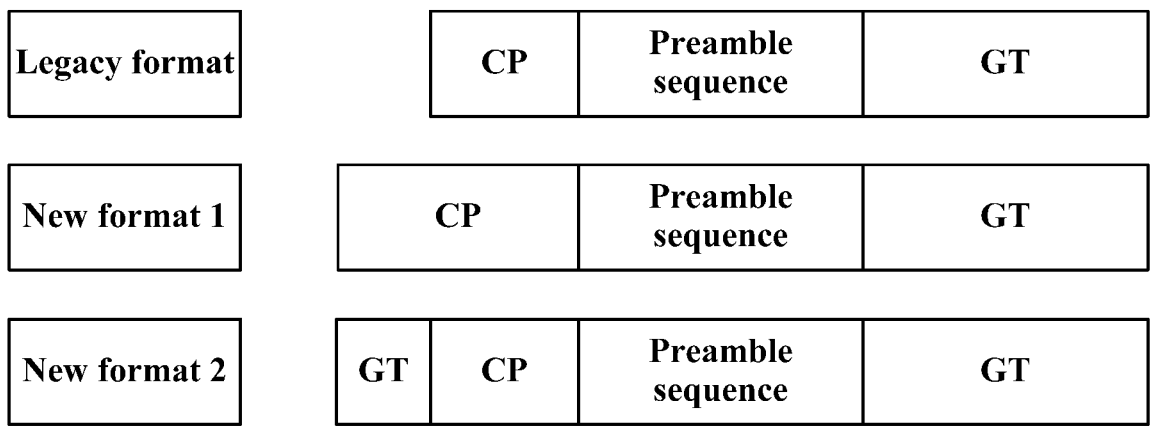
FIG. 14 is another diagram illustrating alignment of slot boundaries of nodes, which are initially accessed, achieving simultaneous reception in an IAB network according to an embodiment of the present disclosure.

Two proposals for improvements to the solutions in the related art are given in FIG. 14.

In new format 1, a longer CP is introduced. This design may cover a larger deviation of the propagation time between the IAB node and the child node. Specifically, the increase amount of the CP may be set according to two set values of the deviation of the transmission delay. For example, the maximum propagation time between the IAB node and the donor node is set to T1_Max, the minimum propagation time between the IAB node and the child node is set to T2_Min, and the difference T_diff of the propagation time between the IAB node and the child node satisfies that T_diff=T1_Max−T2_Min. The extension amount of the length of the CP is T_diff.

In new format 2, an additional guard time (GT) is added on the basis of an original access signal. This format can tolerate a certain amount of difference of the propagation time, and also can prevent interference to a previous transmission unit. For example, the previous transmission unit is the IAB node and does not completely terminate at the sending occasion of sending data (such as backhaul link data), and the uplink access signal sent by the child node causes interference to data sending of the IAB node.

Through the introduction of the new format of the uplink access signal, the access signal sent by the child node and the downlink traffic and/or control data sent by the father node fall within the same reception time sequence so as to achieve effective multiplexing of the access link and the backhaul link.

Embodiment Eight

In the embodiment of the present disclosure, besides the situation is achieved that the IAB node simultaneously receives data from the father node and uplink access link data sent by the child node of the IAB node, it is achieved that the IAB node simultaneously sends uplink data to the father node and downlink data to the child node of the IAB node so that the multiplexing of the IAB simultaneously sending data is achieved.

FIG. 2 includes a father node, an IAB node and a child node. The father node is the father node of the IAB node. The IAB node transmits backhaul link data to the father node through a radio link, the child node is a subordinate link of the IAB node, and the IAB node transmits backhaul data or access link data to the child node through a radio link. Whether the access link or the backhaul link is transmitted depends on the type of the child node. It is assumed that the IAB node simultaneously receives the data sent by the father node and the data sent by the child node.

As shown in FIG. 8A, a donor node and the network of the IAB node at each level maintain a common absolute timing occasion (within an error range). This unified timing may be achieved through mechanisms such as OTA or GPS. If these nodes send data to the child node, the data is sent with this timing occasion as a reference point. The reference point is referred to as the downlink sending occasion.

These downlink transmission occasions refer to potential downlink transmission occasions, which may be frames, the number of OFDM symbols, or slot boundaries, or time intervals in units of the duration of several OFDM symbols. For the downlink sending occasion, it is not required that all nodes send at this occasion, but the downlink data may only be sent at a potential downlink transmission occasion. The downlink data includes downlink control data or downlink traffic data. These downlink sending occasions may serve as reference points for downlink sending, and the IAB node or the donor node may strictly perform sending operations or scheduling processes at this occasion to achieve an offset of several amounts of time by taking these occasions as reference points. A unit of the offset of amounts of time may be duration of one or several OFDM symbols.

In the embodiment, the IAB node sends related control information such as uplink traffic and/or feedback measurement to the father node while simultaneously sending downlink control and/or control information to the child node.

The timing of the IAB node sending data to the father node is determined by the father node. Due to the existence of the propagation delay, a deviation between the occasion when the IAB node sends the uplink data to the father node and the occasion of downlink sending exists. The timing relationship is as indicated by the double-arrow dotted line in FIG. 15.

Figure 15:
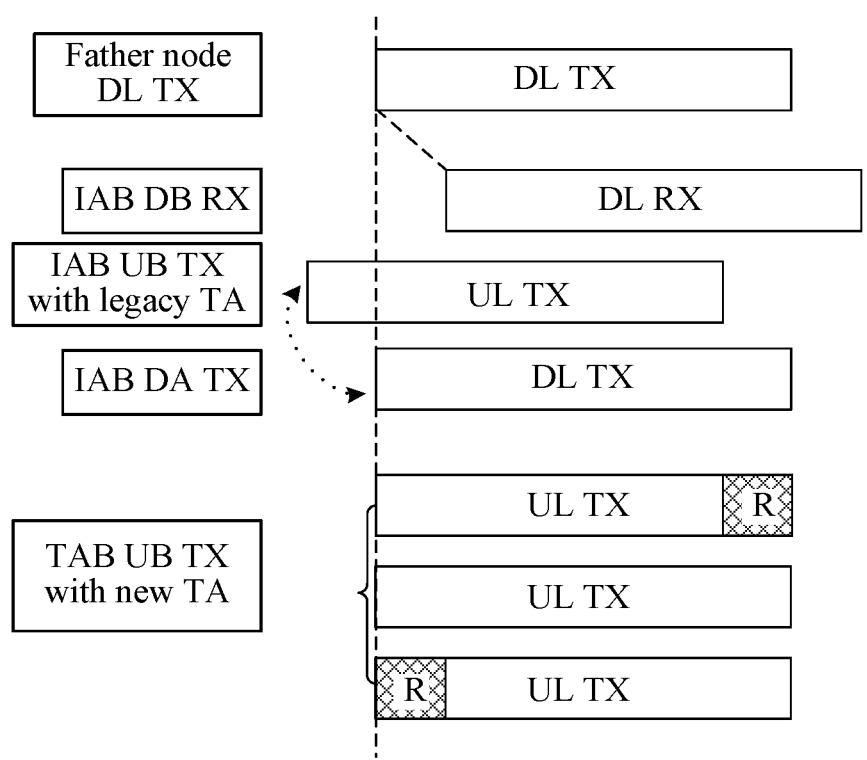
FIG. 15 is a diagram illustrating alignment of slot boundaries of nodes achieving simultaneous sending in an IAB network according to an embodiment of the present disclosure.

In FIG. 15, The timing indicated by the UB TX with new TA of the IAB node is aligned with the timing of the downlink sending occasion, and the sending structure is shown in the figure. The UB TX represents uplink backhaul link transmit.

In a sending structure, a part of a time unit is sent. For example, one or several OFDM symbols are advanced at the uplink sending occasion of the IAB node scheduled by the father node, and a certain time unit is reserved in order to prevent the collision between the uplink sending to the father node and the uplink reception in time.

In another sending structure, the father node schedules a complete part of a time unit. For example, if the propagation time of the IAB node is very small and one or several OFDM symbols are not advanced when the IAB Node sends data to the father node, the IAB node may send a complete time unit.

Figure 16:
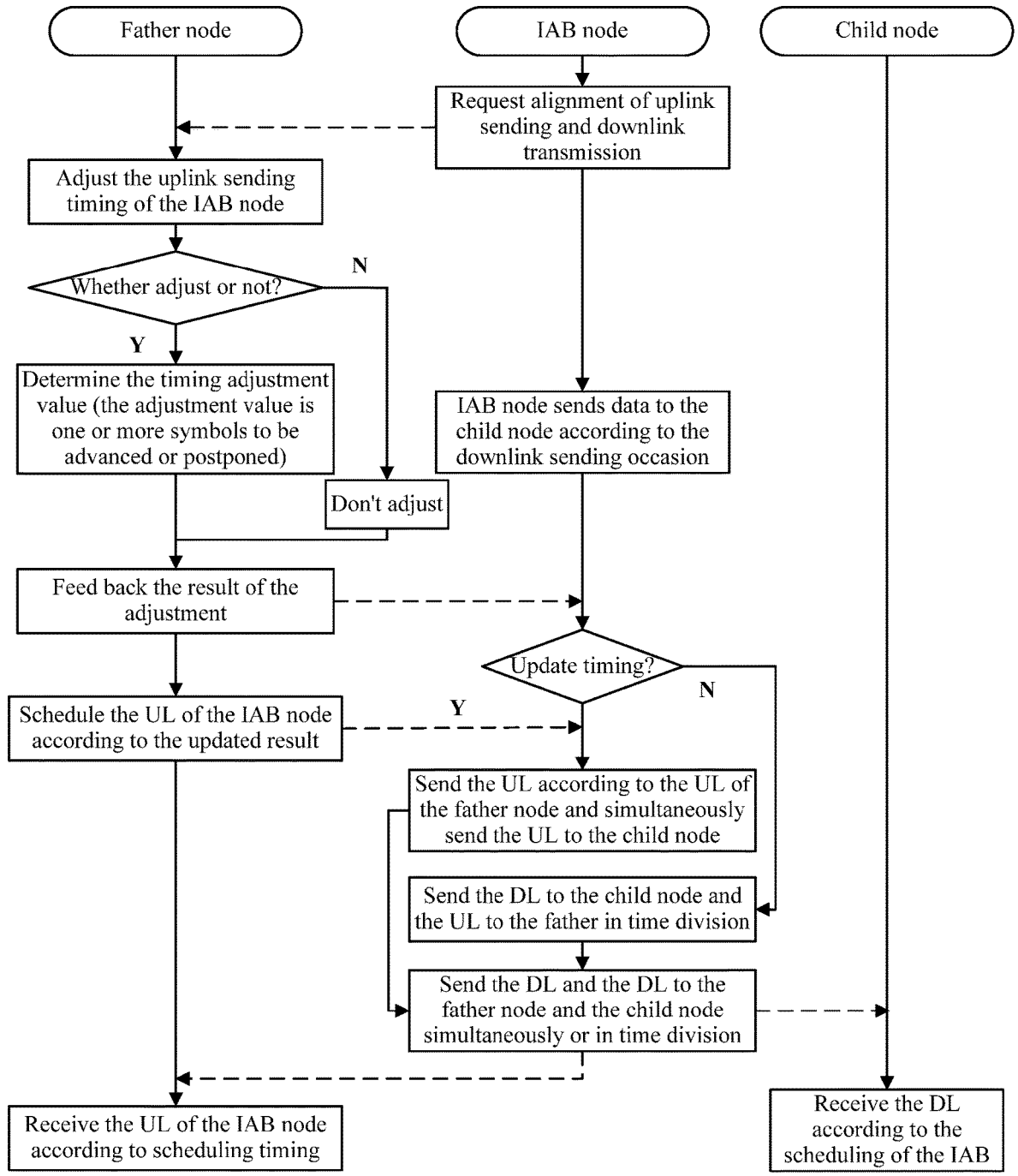
FIG. 16 is a flowchart illustrating alignment of slot boundaries of nodes achieving simultaneous sending in an IAB network according to an embodiment of the present disclosure.

To achieve that the IAB node simultaneously sends data to the father node and the child node, a mechanism is introduced as shown in FIG. 16.

As shown in FIG. 16, in order for the IAB node to perform frequency division multiplexing (FDM) or space division multiplexing (SDM) on the child node and the father node, the IAB node requests an alignment request of upward sending and downward sending from the father node. Further, the request information includes a sending alignment request of a time unit. The time unit includes an index of the number of OFDM symbols, or an index of slots, or an index of intra-slot OFDM symbols. The index of intra-slot symbols includes a bitmap indication mode or indicates an index of an initial OFDM symbol and the number of OFDM symbols of duration.

After receiving the alignment request, the father node determines whether to perform adjustment according to the time unit requested by the IAB node. If the time unit for alignment requested by the IAB node is a serial number of OFDM symbols or a serial number of slots, the response information of the father node includes the situation of the alignment according to the number of OFDM symbols or the slots corresponding to the indexes. The response information includes complete alignment or positive or negative time adjustment based on the number of OFDM symbols or on the slot boundaries. The adjustment amount is the duration of the OFDM symbol and may be the duration corresponding to one or more OFDM symbols.

After receiving the alignment request, the father node determines whether to perform adjustment according to the time unit requested by the IAB node. If the time unit for the alignment requested by the IAB node is an index of OFDM symbols, the response information of the father node includes whether the indexes of OFDM symbols are aligned.

After receiving the response to the alignment request sent by the father node, the IAB node determines whether the sending alignment of the child node and the father node may be performed according to a certain time unit (such as the number of OFDM symbols, slots, or several OFDM symbols). If the IAB node receives a positive response, the child node and father node simultaneously send data at these time domain units.

Further, the alignment requested by the IAB node may be in the form of a period, or the father node semi-statically performs the alignment configuration at the time domain unit.

Embodiment Nine

In the present disclosure, and in the above embodiments, the timing alignment controls are performed on the data transmission of the IAB node all by using the same absolute timing occasion of downlink data sending as the standard. However, in practical application, the downlink data may be not sent at the same absolute timing occasion. In this situation, the alignment of the occasion when the IAB node simultaneously sends uplink data to the father node and the occasion when the IAB node sends uplink data to the child node of the IAB node may be achieved through the mode provided by the embodiment. In the embodiment, the IAB network structure in FIG. 2 is still taken for illustration below.

Figure 17:
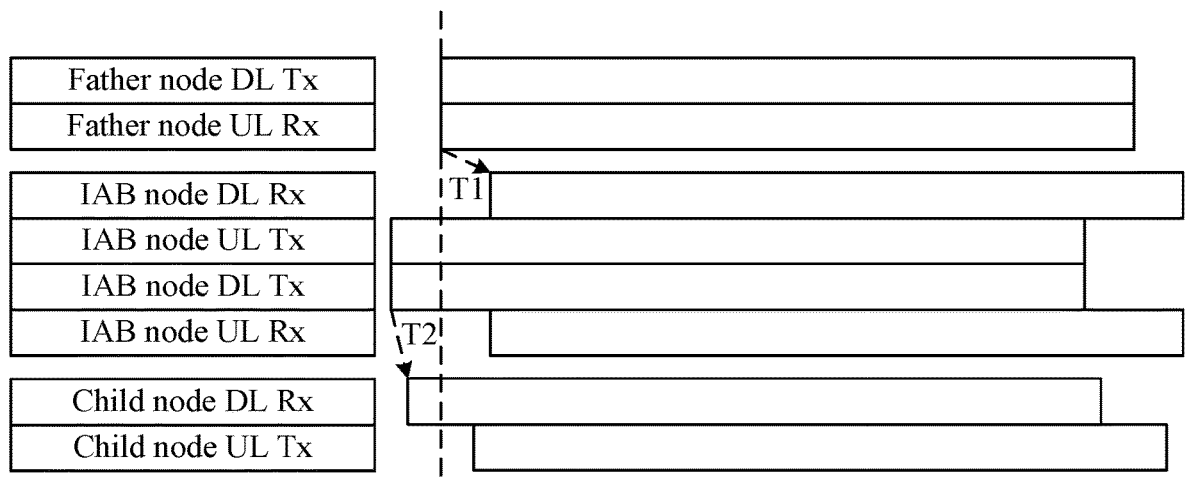
FIG. 17 is a diagram illustrating alignment of slot boundaries of nodes achieving simultaneous sending and misalignment of the transmission slots of downlink data in an IAB network according to an embodiment of the present disclosure.

FIG. 2 includes a father node, an IAB node and a child node. The father node is the father node of the IAB node. The IAB node transmits backhaul link data to the father node through a radio link, the child node is a subordinate link of the IAB node, and the IAB node transmits backhaul data or access link data to the child node through a radio link. Whether the access link or the backhaul link is transmitted depends on the type of the child node. It is assumed that the IAB node simultaneously receives the data sent by the father node and the data sent by the child node. As shown in FIG. 17, the donor node and the network of the IAB node at each level maintain their respective timings, that is, it is not required that all IAB nodes or donor nodes in the IAB network maintain the same downlink sending occasion. For example, a deviation between the downlink transmission timing of the father node and the downlink transmission timing of the IAB node exists. In FIG. 17, the DL Tx represents downlink transmit, the UL Rx represents uplink receive, the DL Rx represents downlink receive, and the UL Tx represents uplink transmit.

From the perspective of the IAB node, to perform SDM or FDM of the backhaul link and access link, it is required that the timing of sending of the IAB node to the father node is aligned with the timing of sending of the IAB node to the child node.

For the child node, to enable the sending timing of the child node to correspond to the downlink reception timing of the IAB node, the timing of the UL TX of the child node may lag behind the timing of the DL RX of the child nod, which is timing lagging.

A mode in which the IAB node indicates timing lagging to the child node is a TA2 command, that is, the IAB node indicates to the child node a TA2 command with a value of 2*T2−2*T1, and then the child node adjusts the uplink sending to experience T2 propagation delays to reach the downlink transmissions of the IAB node and the father node, so that synchronization is achieved. In the situation where the child node is an IAB node, the timing of the DL RX may further be advanced through an fl-AP or RRC signaling.

Embodiment Ten

Figure 18:
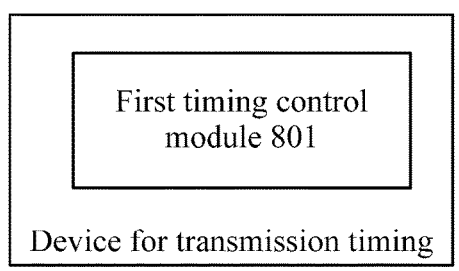
FIG. 18 is a structural diagram of a device for transmission timing according to an embodiment of the present disclosure.

The embodiment provides a device for transmission timing. The device for transmission timing may be applied to various base stations and, in particular, to integrated access and backhaul (IAB) stations. The device is a control device mainly applied to an IAB node. Referring to FIG. 18, the device includes a first timing control module 801.

The first timing control module 801 is configured to send timing control information for controlling data transmission to a third node and/or a first node.

The timing control information is used to control timing alignment of uplink data occasion received by the second node from the third node and downlink data occasion received by the second node from the first node, or to control timing alignment of downlink data transmission occasion of the second node and uplink data transmission occasion of the second node. For the steps and specific processes implemented by the various modules in the device, reference may be made to the multiplexing process of the timing alignment of the slots of the data transmission of the nodes shown in each embodiment described above, which are not repeated herein.

For example, in the above embodiments, for the situation where the alignment of slots of data transmission is controlled to be achieved according to slot boundaries, when the first timing control module 801 controls timing alignment of uplink data occasion received by the second node from the third node and downlink data occasion received by the second node from the first node, one of the modes described below is specifically included.

A reception slot of the IAB node receiving access data sent by the child node is timing aligned with a reception slot of the IAB node receiving backhaul link data sent by the father node at a time unit through the mode of a timing adjustment command TA2.

A reception slot of the IAB node receiving access data sent by the child node and a reception slot of the IAB node receiving backhaul link data sent by the father node are configured through the mode of an interface between a centralized unit and a distributed unit or the mode of RRC signaling, and the reception slot of the IAB node receiving the access data sent by the child node is timing aligned with the reception slot of the IAB node receiving the backhaul link data sent by the father node at a time unit.

A reception slot of the IAB node receiving access data sent by the child node is aligned with a reception slot of the IAB node receiving backhaul link data sent by the father node at a time unit through a background configuration mode of operation, administration and maintenance (OAM). As another example, based on the alignment achieved according to symbols, controlling the timing alignment of the uplink data occasion received by the second node from the third node and the downlink data occasion received by the second node from the first node includes one of the modes described below.

Reception timing of the access data sent by the child node by the IAB node is adjusted to be advanced or postponed by the duration of N OFDM symbols than the timing of the father node sending backhaul link data through the mode of a timing adjustment command TA2, and N is greater than or equal to 1.

Reception timing of the access data sent by the child node by the IAB node is configured through the mode of an interface between a centralized unit and a distributed unit or the mode of RRC signaling, and the reception timing of the access data sent by the child node by the IAB node is adjusted to be advanced or postponed by the duration of N OFDM symbols than the timing of the father node sending backhaul link data.

The reception timing of access data sent by the child node by the IAB node is adjusted to be advanced or postponed by the duration of N OFDM symbols than the timing of the father node sending backhaul link data through the background configuration mode of operation, administration and maintenance (OAM).

Figure 19:
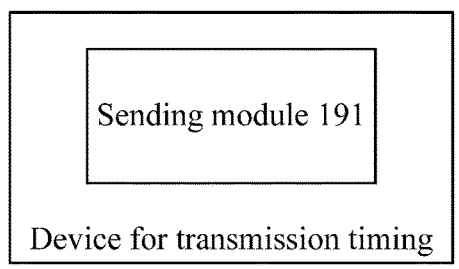
FIG. 19 is a diagram showing second structures of a device for transmission timing according to an embodiment of the present disclosure.

In the embodiment, the backhaul link data received by the IAB node is specifically sent by the father node of the IAB node. Therefore, the present disclosure further provides the structure of another device for transmission timing. The device is constructed on the basis of the father node. Referring to FIG. 19, the device includes a sending module 191.

The sending module 191 is configured to send backhaul link data to the integrated access and backhaul (IAB) node through a radio link. The backhaul link data is used to determine the timing control information of a child node corresponding to the IAB node. The timing control information is used to control timing alignment of the IAB node and the data transmission occasion between the IAB node and the child node, and the backhaul link data includes an absolute timing occasion for downlink data transmission of each node and the first transmission delay of the IAB node receiving the backhaul link data. For the steps and specific processes implemented by the modules in the device, reference may be made to the multiplexing process of the timing alignment of the slots of the data transmission of the nodes shown in each embodiment described above, which are not repeated herein.

In the embodiment, in the timing process of transmission of the IAB node, two situations of alignment are mainly achieved. One situation is that simultaneous reception is achieved, that is, data from the father node and uplink access link data sent by the child node of the IAB node are simultaneously received; another situation is that simultaneous sending is achieved, that is, uplink data to the father node and downlink data to the child node of the IAB node are simultaneously sent.

Figure 20:
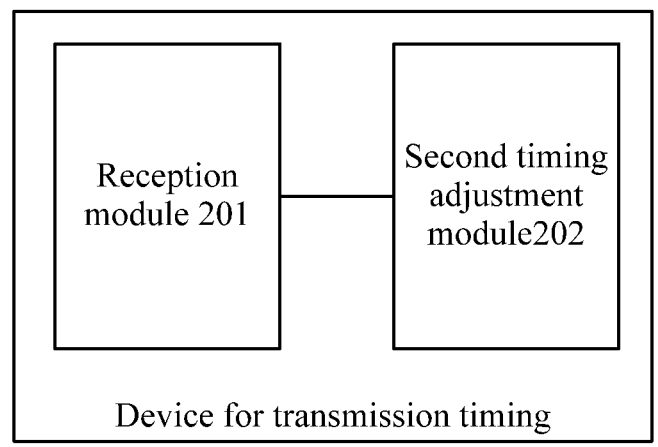
FIG. 20 is a diagram showing third structures of a device for transmission timing according to an embodiment of the present disclosure.

Whether the simultaneous reception or the simultaneous sending is achieved, the control point is the child node of the IAB node in most situations. For example, to achieve the simultaneous reception, the timing of uplink data sending of the child node of the IAB node needs to be controlled to enable that the IAB node can receive the uplink access link data sent by the child node of the IAB node while simultaneously receiving the downlink data from the father node. The embodiment further provides another device for transmission timing to be applied to the child node. Referring to FIG. 20, the device includes a reception module 201 and a second timing adjustment module 202.

The reception module 201 is configured to receive timing control information sent by the second node and downlink transmission timing of each node.

The second timing adjustment module 202 is configured to timing align the reception occasion of uplink data sent by the third node to the second node with the occasion of downlink data received by the second node from the first node according to the timing control information. For the steps and specific processes implemented by the various modules in the device, reference may be made to the multiplexing process of the timing alignment of the slots of the data transmission of the nodes shown in each embodiment described above, which are repeated herein.

According to the device for transmission timing provided by the embodiment, the second node sends the timing control information to the first node and/or the third node to control the alignment of the occasion of the second node receiving data sent by the first node and the occasion of the second node receiving data sent by the third node, or control the alignment of the occasion of the second node sending data to the first node and the occasion of the second node sending data to the third node, so that the IAB node can simultaneously receive data from the father node and data from the child node or can simultaneously send data to the father node and send data to the child node. Therefore, the multiplexing of the transmission occasion of nodes is achieved, the data transmission efficiency of the IAB network is improved, the utilization rate of the allocated resources is also improved, the requirements of the UE is better satisfied, and the user experience is improved. The solution is easy to implement and is applicable to various scenarios. The solution will be popularized as a potential 5G standard internationally and has significant market value.

Embodiment Eleven

Figure 21:
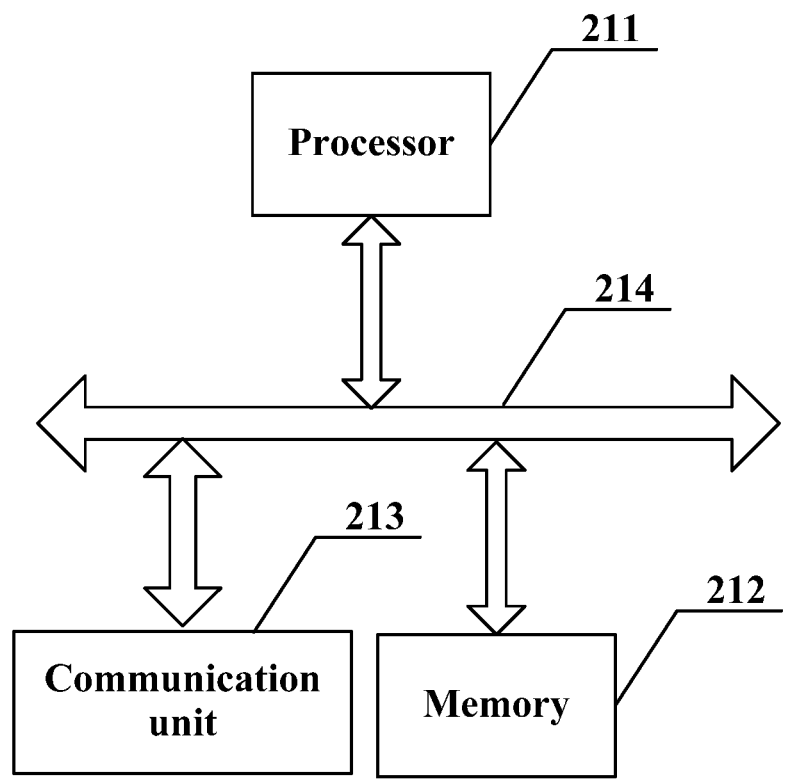
FIG. 21 is a structural diagram of a base station according to an embodiment of the present disclosure.

The embodiment provides a base station, referring to FIG. 21. The system includes a processor 211, a memory 212, a communication unit 213 and a communication bus 214.

The communication bus 214 is configured to implement communication connection between the processor 211, the communication unit 213 and the memory 212.

In one embodiment, the processor 211 is configured to execute one or more first programs stored in the memory to implement steps of the method for transmission timing in the embodiments described above.

In another embodiment, the processor 211 is configured to execute one or more second programs stored in the memory to implement steps of the method for transmission timing in the embodiments described above.

The embodiment further provides a computer-readable storage medium. The computer-readable storage medium includes volatile or nonvolatile and removable or non-removable media implemented in any method or technology for the storage of information (such as computer-readable instructions, data structures, computer program modules, or other data). The computer-readable storage medium includes, but is not limited to, a random access memory (RAM), a read-only memory (ROM), an electrically erasable programmable read-only memory (EEPROM), a flash memory or other memory technologies, a compact disc read-only memory (CD-ROM), a digital versatile disc (DVD) or another optical disc storage, a magnetic cassette, a magnetic tape, disk storage or another magnetic storage device, or any other medium used for storing desired information and accessible by a computer.

In an example, the computer-readable storage medium in the embodiment may be configured to store one or more first computer programs, where the one or more first computer programs are executable by one or more processors to implement steps of the method for transmission timing in the embodiments described above.

In another example, the computer-readable storage medium in the embodiment may be configured to store one or more second computer programs, where the one or more second computer programs are executable by one or more processors to implement steps of the method for transmission timing in the embodiments described above.

The embodiment further provides a first computer program (or computer software) which may be distributed on a computer-readable medium and executed by a computing device to implement at least one step of the method for transmission timing illustrated in the embodiments described above. In some situations, the at least one step illustrated or described may be performed in sequences different from those described in the embodiments described above.

The embodiment further provides a second computer program (or computer software) which may be distributed on a computer-readable medium and executed by a computing device to implement at least one step of the method for transmission timing illustrated in the embodiments described above. In some situations, the at least one step illustrated or described may be performed in sequences different from those described in the embodiments described above.

The embodiment further provides a computer program product. The computer program product includes a computer-readable device on which the first computer program or the second computer program illustrated above is stored. The computer-readable device in the embodiment may include the computer-readable storage medium illustrated above.

Functional modules/units in all or part of the steps of the method, the system, and the device disclosed above may be implemented as software (which may be implemented by computer program codes executable by a computing device), firmware, hardware and appropriate combinations thereof. In the hardware implementation, the division of the functional modules/units mentioned in the above description may not correspond to the division of physical components. For example, one physical component may have multiple functions, or one function or step may be performed jointly by several physical components. Some or all physical components may be implemented as software executable by a processor such as a central processor, a digital signal processor or a microcontroller, may be implemented as hardware, or may be implemented as integrated circuits such as application-specific integrated circuits.

The communication medium generally includes computer-readable instructions, data structures, computer program modules or other data in a modulated data signal such as carriers or other transport mechanisms, and may include any information delivery medium. Therefore, the present disclosure is not limited to any particular combination of hardware and software.

What is claimed is:

1. A method for transmission timing, comprising:
   sending, by a second node, timing control information for controlling data transmission to a third node and/or a first node; wherein
   the timing control information is used to control timing alignment of reception timing of uplink data received by the second node transmitted from the third node and reception timing of downlink data received by the second node transmitted from the first node, or to control timing alignment of transmission timing of downlink data of the second node and transmission timing of uplink data of the second node;
   wherein the timing control information comprises a data format selection strategy for adjusting the third node to transmit an uplink access signal; and
   controlling the timing alignment of the reception timing of the uplink data received by the second node transmitted from the third node and the reception timing of the downlink data received by the second node transmitted from the first node comprising: adjusting, according to the data format selection strategy, data sent by the third node into a reception window where the second node receives data from the first node;
   wherein the data format selection strategy for adjusting the third node comprises:
   increasing duration of a cyclic prefix of data of the third node according to a difference value between a first transmission delay between the first node and the second node and a second transmission delay between the second node and the third node to enable an access signal sent by the third node and downlink traffic and/or control data sent by the first node fall within the same reception time sequence; or
   adding a guard interval before a cyclic prefix of data of the third node according to a difference value between a first transmission delay between the first node and the second node and a second transmission delay between the second node and the third node to enable an access signal sent by the third node and downlink traffic and/or control data sent by the first node fall within the same reception time sequence;
   wherein after the second node receives a backhaul link data sent by the first node, the timing control information is calculated according to an absolute timing occasion in the backhaul link data, the first transmission delay and the second transmission delay.

2. The method according to claim 1, wherein the second node is an integrated access and backhaul (IAB) node, the first node is a father node of the second node, and the third node is a child node of the second node.

3. The method according to claim 2, wherein the timing control information comprises a time offset and the time offset is acquired by:
  determining a first transmission delay between the first node and the second node and a second transmission delay between the second node and the third node; and
  calculating the time offset of timing alignment according to the first transmission delay and the second transmission delay.

4. The method according to claim 3, wherein the time offset is a difference between two times the second transmission delay and the first transmission delay.

5. The method according to claim 4, wherein in response to the timing control information being used to control the timing alignment of the reception timing of the uplink data received by the second node transmitted from the third node and the reception timing of the downlink data received by the second node transmitted from the first node, controlling the timing alignment of the reception timing of the uplink data received by the second node transmitted from the third node and the reception timing of the downlink data received by the second node transmitted from the first node comprises one of following modes:
  timing aligning, through a mode of a timing adjustment command, a reception slot of the second node receiving access link data sent by the third node with a reception slot of the second node receiving backhaul link data sent by the first node at a time unit;
  configuring, through a mode of an interface between a centralized unit and a distributed unit or a mode of radio resource control (RRC) signaling, a reception slot of the second node receiving access link data sent by the third node and a reception slot of the second node receiving backhaul link data sent by the first node, and timing aligning the reception slot of the second node receiving the access link data sent by the third node with the reception slot of the second node receiving the backhaul link data sent by the first node at a time unit; or
  timing aligning, through a background configuration mode of operation, administration and maintenance (OAM), a reception slot of the second node receiving access link data sent by the third node with a reception slot of the second node receiving backhaul link data sent by the first node at a time unit.

6. The method according to claim 5, wherein the time unit is a joint time unit comprising at least one orthogonal frequency division multiplexing (OFDM) symbol or at least one slot.

7. The method according to claim 3, wherein the time offset is a number of OFDM symbols.

8. The method according to claim 7, in response to the timing control information being used to control the timing alignment of the reception timing of the uplink data received by the second node transmitted from the third node and the reception timing of the downlink data received by the second node transmitted from the first node, after calculating the time offset of the timing alignment according to the first transmission delay and the second transmission delay, further comprising:
  timing advance of reception timing of the second node being at least one OFDM symbol; and
  the calculating the time offset of the timing alignment according to the first transmission delay and the second transmission delay comprises:
    determining, according to the first transmission delay and/or the second transmission delay and duration of a OFDM symbol, the number of the OFDM symbols actually needed to be adjusted.

9. The method according to claim 8, wherein controlling the timing alignment of the reception timing of the uplink data received by the second node transmitted from the third node and the reception timing of the downlink data received by the second node transmitted from the first node comprises one of following modes:
  adjusting, through a mode of a timing adjustment command, reception timing of access link data sent from the third node received by the second node to be advanced or postponed by duration of N OFDM symbols than a timing occasion of the first node sending backhaul link data to the second node, wherein N is greater than or equal to 1 and postponing N OFDM symbols refers to a fixed time unit minus duration corresponding to a number of OFDM symbols to be advanced;
  configuring, through a mode of an interface between a centralized unit and a distributed unit or a mode of RRC signaling, reception timing of access link data sent from the third node received by the second node, and adjusting the reception timing of the access link data sent from the third node received by the second node to be advanced or postponed by the duration of N OFDM symbols than a timing occasion of the first node sending backhaul link data to the second node, wherein N is greater than or equal to 1; or
  adjusting, through a background configuration mode of OAM, reception timing of access link data sent from the third node received by the second node to be advanced or postponed by the duration of N OFDM symbols than a timing occasion of the first node sending backhaul link data to the second node, wherein N is greater than or equal to 1.

10. The method according to claim 1, before sending, by the second node, the timing control information for controlling the data transmission to the third node, further comprising: detecting whether communication access between the second node and the third node is initial access communication; wherein
  in response to the communication access between the second node and the third node being the initial access communication, the second node issues, through a system information broadcasting mode, the timing control information and a signal format for the initial access to the third node.

11. The method according to claim 1, in response to controlling the timing alignment of the transmission timing of downlink data of the second node and the transmission timing of uplink data of the second node, further comprising:
  sending, by the second node, a request to the first node for timing aligning uplink data transmission with downlink data transmission.

12. A base station, comprising a processor, a memory, a communication unit and a communication bus; wherein
  the communication bus is configured to implement radio communication connection between the processor, the communication unit and the memory;
  the processor is configured to execute one or more programs stored in the memory to implement the method of claim 1.

13. A non-transitory computer-readable storage medium, which is configured to store one or more first computer programs and one or more second computer programs, wherein the one or more first computer programs are executable by one or more processors to implement the method of claim 1.

14. A transmission timing method, comprising:
- receiving, by a third node, timing control information sent by a second node; and
- aligning, according to the timing control information, timing of uplink transmission sent by the third node to the second node with timing of downlink transmission received by the second node from a first node;
- wherein the timing control information comprises a data format selection strategy for adjusting the third node to transmit an uplink access signal; and
- aligning, according to the timing control information, timing of uplink transmission sent by the third node to the second node with timing of downlink transmission received by the second node from a first node comprising: adjusting, according to the data format selection strategy, data sent by the third node into a reception window where the second node receives data from the first node;
- wherein the data format selection strategy for adjusting the third node comprises:
  - increasing duration of a cyclic prefix of data of the third node according to a difference value between a first transmission delay between the first node and the second node and a second transmission delay between the second node and the third node to enable an access signal sent by the third node and downlink traffic and/or control data sent by the first node fall within the same reception time sequence; or
  - adding a guard interval before a cyclic prefix of data of the third node according to a difference value between a first transmission delay between the first node and the second node and a second transmission delay between the second node and the third node to enable an access signal sent by the third node and downlink traffic and/or control data sent by the first node fall within the same reception time sequence;
- wherein after the second node receives a backhaul link data sent by the first node, the timing control information is calculated according to an absolute timing occasion in the backhaul link data, the first transmission delay and the second transmission delay.

15. The method according to claim 14, wherein the third node is a child node of the second node, and the second node is an integrated access and backhaul (IAB) node.

16. The method according to claim 15, wherein in response to the timing control information being a number of orthogonal frequency division multiplexing (OFDM) symbols, aligning, according to the timing control information, the timing of the uplink transmission sent by the third node to the second node with the timing of the downlink transmission received by the second node from the first node comprises one of following modes:
- adjusting, through a mode of a timing adjustment command, reception timing of access link data sent from the third node received by the second node to be advanced or postponed by the duration of N OFDM symbols than a timing occasion of the first node sending backhaul link data to the second node, wherein N is greater than or equal to 1 and postponing N OFDM symbols refers to a fixed time unit minus duration corresponding to a number of OFDM symbols to be advanced;
- configuring, through a mode of an interface between a centralized unit and a distributed unit or a mode of RRC signaling, reception timing of access link data sent from the third node received by the second node, and adjusting the reception timing of the access link data sent from the third node received by the second node to be advanced or postponed by the duration of N OFDM symbols than a timing occasion of the first node sending backhaul link data to the second node, wherein N is greater than or equal to 1; or
- adjusting, through a background configuration mode of OAM, reception timing of access link data sent from the third node received by the second node to be advanced or postponed by the duration of N OFDM symbols than a timing occasion of the first node sending backhaul link data to the second node, wherein N is greater than or equal to 1.

17. The method according to claim 15, wherein in response to the timing control information being a time unit, aligning, according to the timing control information, the timing of the uplink transmission sent by the third node to the second node with the timing of the downlink transmission received by the second node from the first node comprises one of following modes:
- timing aligning, through a mode of a timing adjustment command and according to a time unit, a reception slot of the second node receiving access link data sent by the third node with a reception slot of the second node receiving backhaul link data sent by the first node;
- configuring, through a mode of an interface between a centralized unit and a distributed unit or a mode of radio resource control (RRC) signaling, a reception slot of the second node receiving access link data sent by the third node and a reception slot of the second node receiving backhaul link data sent by the first node, and timing aligning, according to a time unit, the reception slot of the second node receiving the access link data sent by the third node with the reception slot of the second node receiving the backhaul link data sent by the first node; or
- timing aligning, through a background configuration mode of operation, administration and maintenance (OAM) and according to a time unit, a reception slot of the second node receiving access link data sent by the third node with a reception slot of the second node receiving backhaul link data sent by the first node.

18. A device for transmission timing, comprising:
- a first timing control module, which is configured to send timing control information for controlling data transmission to a third node and/or a first node; wherein
- the timing control information is used to control timing alignment of reception timing of uplink data received by the second node transmitted from the third node and reception timing of downlink data received by the second node transmitted from the first node, or to control timing alignment of transmission timing of downlink data of the second node and transmission timing of uplink data of the second node;
- wherein the timing control information comprises a data format selection strategy for adjusting the third node to transmit an uplink access signal; and
- controlling the timing alignment of the reception timing of the uplink data received by the second node transmitted from the third node and the reception timing of the downlink data received by the second node transmitted from the first node comprising: adjusting, according to the data format selection strategy, data sent by the third node into a reception window where the second node receives data from the first node;

wherein the data format selection strategy for adjusting the third node comprises:

increasing duration of a cyclic prefix of data of the third node according to a difference value between a first transmission delay and the first node and the second node and a second transmission delay between the second node and the third node to enable an access signal sent by the third node and downlink traffic and/or control data sent by the first node fall within the same reception time sequence; or adding a guard interval before a cyclic prefix of data of the third node according to a difference value between a first transmission delay between the first node and the second node and a second transmission delay between the second node and the third node to enable an access signal sent by the third node and downlink traffic and/or control data sent by the first node fall within the same reception time sequence;

wherein after the second node receives a backhaul link data sent by the first node, the timing control information is calculated according to an absolute timing occasion in the backhaul link data, the first transmission delay and the second transmission delay.

* * * * *